US011606138B1

(12) United States Patent
Speidel et al.

(10) Patent No.: US 11,606,138 B1
(45) Date of Patent: *Mar. 14, 2023

(54) ORBITAL BASE STATION FILTERING OF INTERFERENCE FROM TERRESTRIAL-TERRESTRIAL COMMUNICATIONS OF DEVICES THAT USE PROTOCOLS IN COMMON WITH ORBITAL-TERRESTRIAL COMMUNICATIONS

(71) Applicant: Lynk Global, Inc., Falls Church, VA (US)

(72) Inventors: Tyghe Robert Speidel, Washington, DC (US); Kevin Jackson, Orlando, FL (US); Zheng Liu, Chantilly, VA (US); Andrew J. Gerber, Darnestown, MD (US)

(73) Assignee: Lynk Global, Inc., Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,711

(22) Filed: Feb. 4, 2021

Related U.S. Application Data

(63) Continuation of application No. 15/963,903, filed on Apr. 26, 2018, now Pat. No. 10,951,305.

(51) Int. Cl.
*H04B 7/204* (2006.01)
*H04B 7/185* (2006.01)
*H04B 7/19* (2006.01)

(52) U.S. Cl.
CPC ....... *H04B 7/2048* (2013.01); *H04B 7/18519* (2013.01); *H04B 7/18523* (2013.01); *H04B 7/19* (2013.01); *H04B 7/2041* (2013.01)

(58) Field of Classification Search
CPC .............. H04B 7/2048; H04B 7/18519; H04B 7/18523; H04B 7/19; H04B 7/2041
See application file for complete search history.

(56) References Cited

U.S. PATENT DOCUMENTS

| 3,349,398 A | 10/1967 | Werth |
| 5,642,355 A | 6/1997 | Smith |

(Continued)

FOREIGN PATENT DOCUMENTS

| WO | 2016195813 | 12/2016 |
| WO | 2016209332 | 12/2016 |

(Continued)

OTHER PUBLICATIONS

Coulomb et al., "Low Earth Orbit Satellite Payload for Personal Communications," 3rd European Conference on Satellite Communications (ECSC-3) (Nov. 1993).

(Continued)

*Primary Examiner* — Janice N Tieu
(74) *Attorney, Agent, or Firm* — Haynes and Boone LLP

(57) ABSTRACT

An orbiting multiple access transceiver communicates with terrestrial mobile stations which are also capable of communicating with terrestrial base stations. The multiple access transceiver is configured to sample a signal when a terrestrial mobile station of interest is not transmitting to produce a sample signal. The sample signal may be processed to produce an out-of-phase signal that may be applied to a signal when the terrestrial mobile station of interest is transmitting to produce a clearer signal from the terrestrial mobile station of interest.

12 Claims, 17 Drawing Sheets

(56) References Cited

U.S. PATENT DOCUMENTS

| | | | |
|---|---|---|---|
| 5,740,164 A | 4/1998 | Liron | |
| 5,898,902 A | 4/1999 | Tuzov | |
| 5,943,324 A | 8/1999 | Ramesh et al. | |
| 5,991,598 A | 11/1999 | Nawata | |
| 6,008,758 A | 12/1999 | Campbell | |
| 6,031,826 A | 2/2000 | Hassan | |
| 6,101,177 A | 8/2000 | Bodin et al. | |
| 6,157,621 A | 12/2000 | Brown et al. | |
| 6,377,615 B1 | 4/2002 | Sourour et al. | |
| 6,404,769 B1 | 6/2002 | Kapoor | |
| 6,493,322 B1 | 12/2002 | Chennakeshu et al. | |
| 7,257,371 B1 | 8/2007 | Bettinger et al. | |
| 7,502,382 B1 | 3/2009 | Liu et al. | |
| 7,515,566 B2 | 4/2009 | Dale et al. | |
| 8,538,327 B2 | 9/2013 | Sayeed et al. | |
| 9,042,408 B2 | 5/2015 | Gaal et al. | |
| 9,184,829 B2 | 11/2015 | Miller et al. | |
| 9,628,956 B1 | 4/2017 | Kim | |
| 9,788,306 B2 | 10/2017 | Chen et al. | |
| 9,954,601 B2 | 4/2018 | Buer et al. | |
| 9,973,266 B1 | 5/2018 | Avellan et al. | |
| 10,084,535 B1 | 9/2018 | Speidel et al. | |
| 2001/0022779 A1 | 9/2001 | Wheatley et al. | |
| 2002/0060995 A1* | 5/2002 | Cervello | H04W 72/02 370/332 |
| 2002/0151273 A1 | 10/2002 | Marko | |
| 2002/0164986 A1 | 11/2002 | Briand et al. | |
| 2002/0177403 A1 | 11/2002 | LaPrade et al. | |
| 2003/0028339 A1* | 2/2003 | Caso | H03M 1/1014 702/90 |
| 2004/0192197 A1 | 9/2004 | Capots et al. | |
| 2004/0192201 A1 | 9/2004 | Febvre et al. | |
| 2006/0246913 A1 | 11/2006 | Merboth et al. | |
| 2007/0078541 A1* | 4/2007 | Rogers | G10L 19/025 700/94 |
| 2007/0197208 A1 | 8/2007 | Kanada et al. | |
| 2008/0143589 A1 | 6/2008 | Dankberg et al. | |
| 2010/0220780 A1 | 9/2010 | Peng et al. | |
| 2010/0322337 A1 | 12/2010 | Ylitalo et al. | |
| 2011/0013678 A1 | 1/2011 | Smith et al. | |
| 2011/0135043 A1 | 6/2011 | Downey et al. | |
| 2012/0155516 A1 | 6/2012 | Kim et al. | |
| 2012/0302160 A1 | 11/2012 | Silny et al. | |
| 2014/0105189 A1 | 4/2014 | Papasakellariou et al. | |
| 2015/0304021 A1 | 10/2015 | Rudrapatna | |
| 2016/0080072 A1 | 3/2016 | Baudoin et al. | |
| 2016/0205560 A1 | 7/2016 | Hyslop et al. | |
| 2017/0099607 A1 | 4/2017 | Hadani et al. | |
| 2017/0324465 A1 | 11/2017 | Sotom et al. | |
| 2018/0022474 A1 | 1/2018 | Meek | |
| 2018/0034538 A1 | 2/2018 | Baudoin et al. | |
| 2018/0069651 A1* | 3/2018 | Davydov | H04L 5/0001 |
| 2018/0138968 A1 | 5/2018 | Auer | |
| 2018/0254824 A1 | 9/2018 | Speidel et al. | |
| 2018/0254825 A1 | 9/2018 | Speidel et al. | |

FOREIGN PATENT DOCUMENTS

| | | |
|---|---|---|
| WO | 2017072745 | 5/2017 |
| WO | 2017124004 | 7/2017 |

OTHER PUBLICATIONS

Radhakrishnan et al., "Survey of Inter-satellite Communications for Small Satellite Systems: Physical Layer to Network Layer View," IEEE Communications Surveys & Tutorials 18(4):2442-2473 (May 2016).

International Search Report and Written Opinion issued in PCT Application No. PCT/US2019/029411, dated Jul. 9, 2019.

International Search Report and Written Opinion issued in PCT Application No. PCT/US2018/020778, dated Nov. 19, 2018.

International Search Report and Written Opinion issued in PCT Application No. PCT/US2018/020205, dated May 17, 2018.

* cited by examiner

KEY

$f_1$, $f_2$, & $f_3$ $f_4$, $f_5$, & $f_6$ $f_7$, $f_8$, & $f_9$

ORBITAL BASE STATION FILTERING OF INTERFERENCE FROM TERRESTRIAL-TERRESTRIAL COMMUNICATIONS OF DEVICES THAT USE PROTOCOLS IN COMMON WITH ORBITAL-TERRESTRIAL COMMUNICATIONS

FIELD OF THE INVENTION

The present invention relates to a method and apparatus for the filtering interference from terrestrial mobile devices communicating with terrestrial base stations that is encountered at an orbital base station communicating with terrestrial mobile devices in general, and in particular, filtering interference in a cellular system that uses terrestrial base stations and orbital base stations with protocols, spectrum, and/or timing that is common for the terrestrial base stations and the orbital base stations.

CROSS-REFERENCES TO PRIORITY AND RELATED APPLICATIONS

The following applications are related:
1) U.S. Non-provisional patent application Ser. No. 15/857,073, filed Dec. 28, 2017 entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. Provisional Patent Application No. 62/465,945, filed Mar. 2, 2017 entitled "Method for Low-Cost and Low-Complexity Inter-Satellite Link Communications within a Satellite Constellation Network for Near Real-Time, Continuous, and Global Connectivity" (hereinafter "Speidel II"); and
3) U.S. Provisional Patent Application No. 62/490,298 filed Apr. 26, 2017 entitled "Method for Communications between Base Stations Operating in an Orbital Environment and Ground-Based Telecommunications Devices" (hereinafter "Speidel III").

The entire disclosures of applications recited above are hereby incorporated by reference, as if set forth in full in this document, for all purposes.

BACKGROUND

Overview of Mobile Communications

Mobile communication involves signals being sent between a mobile station (MS) and a transceiver that can provide an interface for the MS to communicate to and from other network resources, such as telecommunication networks, the Internet, and the like, to carry voice and data communications, and possibly other features such as location-finding. Being mobile, a portion of the communication path will be wireless and wireless signals might combine when there are multiple transmitters using the same protocol, space, spectrum, and/or time. Because of that, the protocols used by the devices, such as mobile stations and base stations, should handle potential overlap of the use of a wireless space to accommodate multiple mobile stations as there are likely to be multiple mobile stations. One approach is to divide an allocated spectrum into channels, divide time periods into timeslots, and divide a service region into cells, setting power levels such that not all devices transmit significant energy in their signals to the entire service region occupied by receivers. For example, a cellular communications system might operate with protocols wherein a spectrum is divided into predefined channels, transmitters limit their transmissions to predefined timeslots, and power levels are such that a mobile device uses enough power to close a link (i.e., handshake and establish a link connection with sufficient reliability) with a base station and not much more, with a geographic range of the service region divided into cells so that a mobile device need only transmit enough to reach its nearest, or one of its nearest, base station.

A terrestrial cellular communications system comprises terrestrial base stations and mobile devices. The service region of a terrestrial cellular communications system might cover urban areas and other areas with sufficient infrastructure and users to make a service offering feasible. That service region might have gaps in coverage and might not extend to all areas where users with mobile devices might need or want coverage. An orbital communications system comprises orbital base stations and mobile devices. The service region of an orbital communications system might be able to cover more continuously some geographic area than the terrestrial cellular communications system, or even the entire surface of the Earth or other celestial body. A terrestrial cellular communications system and an orbital communications system might coexist in some overlapping regions by using separated and unrelated protocols and spectrum, with users of the terrestrial cellular communications system possibly using one type of mobile station for terrestrial cellular communications and users of the orbital communications system possibly using another type of mobile station for orbital communications.

Terrestrial Cellular Communications Systems

In a terrestrial cellular communications system, a mobile device will typically close a link with a base station that provides the strongest signal at the mobile device's location. A base station will typically close links with multiple mobile devices that are in range of the base station. Using time and frequency division, multiple mobile devices can communicate with a base station at the same time. With GSM, in one example, the spectrum band of 890-915 MHz is used uplink communications (from mobile device to base station) and the spectrum band of 935-960 MHz is used for downlink communications (from base station to mobile devices.

Each spectrum band is partitioned into channels. Each channel has a carrier frequency and the carrier frequencies are separated by about 200 kHz. In the general case, a channel might be defined by its carrier frequency and half of its channel separation on each side, so in this specific case, a channel has a carrier frequency considered to be centered within the channel's 200 kHz spectrum. This provides for 125 channels, and with about one channel on each side of a spectrum band as a guard separation, that leaves 123 channels for moving data. If, on each channel, data is transmitted in frames where a frame comprises eight timeslots that can be separately allocated to mobile devices, 123*8=984 mobile devices can communicate with one base station at a time. For a base station with multiple transceivers, perhaps using directional antennas, one base station might be able to support some multiple of 984 simultaneous links to mobile devices. In some instances, a base station is not ever allocated all 123 channels and in those instances, the base station's capacity is less.

Using some protocol mechanism, such as the use of RACH frames, a coordinated set of base stations in a terrestrial cellular communications system allocates out channels and timeslots to mobile devices that are trying to communicate with base stations. For example, a mobile device might signal its presence with a RACH request and a base station, hearing that request, might return a reply to indicate to the mobile device that it is to use timeslot $t_3$ (of $t_0$ through $t_7$) and frequency $f_{37}$ (of $f_0$ through $f_{122}$).

Transceivers and Mobile Stations

The transceiver may be a component in a base transceiver station (BTS) that handles traffic from multiple transceivers. The BTS might also include antennas and encryption/decryption elements. The antennas might be selective antennas, wherein different MS s at different locations might communicate to their respective transceivers via different antennas of the BTS. The BTS may have a wired, wireless, and/or optical channel to communicate with those other network resources. A BTS might support one or more transceivers and a given base station for supporting mobile communication might have a base station controller (BSC) that controls one or more BTS of that base station.

Examples of mobile stations include mobile phones, cellular phones, smartphones, and other devices equipped to communicate with a particular BTS. While herein the mobile stations are referred to by that name, it should be understood that an operation, function or characteristic of a mobile station might also be that of a station that is effectively or functionally a mobile station, but is not at present mobile. In some examples, the mobile station might be considered instead a portable station that can be moved from place to place but in operation is stationary, such as a laptop computer with several connected peripherals and having a cellular connection. The mobile station might also be stationary, such as a cellular device embedded in a mounted home security system. All that is required is that the mobile station be able to, or be configured to, communicate using a mobile communication infrastructure.

Each of these elements could be implemented using hardware and/or software and include network management and maintenance functionality, but a base station can be described as having one or more transceivers that communicate with mobile stations according to an agreed-upon protocol. This can be by having the BTS being configured, adapted, or programmed to operate according to the agreed-upon protocol for a BTS and having the MS being configured, adapted, or programmed to operate according to the agreed-upon protocol for a MS. The protocol might include details of how to send data between a transceiver and a MS, how to handle errors, how to handle encryption, and how to send control instructions and status data between the BTS and the MSs. For example, parts of the protocol might include interactions wherein an MS contacts a BTS and the BTS indicates to the MS what timing, carrier frequency, and other protocol options the MS is to use. This interaction might include carrying voice data, carrying text data, carrying other data, providing for intracell handover and other tasks.

Examples of BTSs include cellular telephone towers, macro-cell transceivers, femto-cell transceivers, picocells (which might have only one transceiver) and the like. BTSs will communicate with MSs wirelessly. Some BTSs have a backhaul (the interface between the BTS and the other network resources) that is wired, such as with a cellular telephone tower, while some might have a wireless backhaul, such as a microwave point-to-point bidirectional communications channel. Thus, a BTS might be any of several different types of electrically powered devices that receives data streams from MSs and processes those and/or forwards them to other network resources, as well as receiving data streams from the other network resources and processing those and/or forwarding them to MSs over the BTS-MS link(s). In this sense, a BTS acts as an access point for the MSs, to allow an MS to access network resources such as a telecommunications network, the Internet, private networks, etc. The access might be used to route voice calls, other calls, texting, data transfer, video, etc.

A telecommunications network behind a BTS might include a network and switching subsystem that determines how to route data to an appropriate BTS and how to route data received from a BTS. The telecommunications network might also have infrastructure to handle circuit connections and packet-based Internet connections, as well as network maintenance support. In any case, the BTS might be configured to use some protocols with MSs and other protocols with the backhaul.

Mobile Communications Protocols

In many examples herein, communications is described as being between a BTS and one MS for simplicity of explanation, but it should be understood that the interactions might be from a BTS to a transceiver, to a radio circuit, to an antenna, to a MS antenna, to an MS radio circuit, and to software/hardware in the MS. There is also a corresponding path in the other direction from the MS to the BTS. Thus, in some examples where a BTS is communicating with an MS, it is via a transceiver and the example ignores mention of the other transceivers that the BTS might be controlling or otherwise communicating with.

Examples of protocols that a BTS might use include GSM (Global System for Mobile Communications; trademarked by the GSM Association) 2G+ protocols with Gaussian minimum-shift keying (GMSK), EDGE protocols with GMSK and 8-PSK keying. A BTS might handle multiple transceivers that use multiple sets of carrier frequencies within a spectrum band of wireless spectrum that the protocol allows for. Thus, where a spectrum band is logically divided into carrier frequency spectra, a transceiver might use channels that use one (or more) of those carrier frequencies to communicate with an MS. The protocol might specify that for a given channel, there is an uplink subchannel and a downlink subchannel, in contiguous or noncontiguous spectra. In some cases, the uplink subchannel has a carrier frequency adjacent to that of the downlink subchannel. In some cases, all the uplink subchannels are in one spectrum band and all the downlink subchannels are in another spectrum band. For ease of explanation, sometimes a channel is described as having an uplink portion and a downlink portion as if it were one channel, even if the two subchannels of a channel are noncontiguous.

Some BTSs might provide for frequency hopping, where the transceivers and the mobile stations rapidly jump together from carrier frequency to carrier frequency to improve overall BTS performance. The protocol might specify the hopping sequences to use.

In the GSM protocol, transceiver-MS communication involves frames and each frame has up to eight timeslots. With eight timeslots, a transceiver sends out a frame that is directed at up to eight MSs, with each MS assigned a unique timeslot in the frame by the transceiver's BTS. The MSs can send their transmissions in their allotted timeslot and since each MS that is communicating with that transceiver knows which timeslot they are to use, similarly situated MSs can communicate back to the transceiver in their allotted timeslot. A transceiver might not use all eight timeslots.

A signaling channel, such as the GSM protocol's Common Control Channel (CCCH) might be used to convey to the MSs what their allocations are for timeslots and channels/carrier frequencies. For example, some Common Control Channels are used to make access requests (e.g., making RACH requests, which are from a MS to a BTS), for paging (e.g., making PCH requests, which are from a BTS to a MS), for access grant (e.g., an AGCH, which is from a BTS to a MS), and cell broadcast (e.g., CBCH, which is from a BTS to a MS). The AGCH (Access Grant Channel) is used for granting timeslot allocations/carrier allocations. Another channel, the Broadcast Control Channel (BCCH), might or might not be used to send information to the MS, such as Location Area Identity (LAI), a list of neighboring cells that should be monitored by the MS, a list of frequencies used in the cell, cell identity, power control indicator, whether DTX is permitted, and access control (i.e., emergency calls, call barring, etc.).

The protocols for communication between MSs and BTSs might be such that they are standardized so that any standard MS can communicate with any BTS, assuming range requirements are met and membership requirements are met (e.g., that the MS has identified itself to the BTS in such a manner that the BTS, or a service that the BTS uses, determines that the MS is a member of an authorized group or otherwise authorized to use the services provided by the BTS. Some example protocols include the GSM protocols, sometimes referred to as 2G (i.e., second generation) network protocols. Other examples include GPRS (General Packet Radio Services), EDGE (Enhanced Data rates for GSM Evolution, or EGPRS), 3G (third-generation 3G UMTS standards developed by the 3GPP body, or fourth-generation (4G) LTE Advanced protocols.

In these protocols, there are rules for spectrum band use, timing, encoding and conflict resolution. As a BTS is likely to have to communicate with many MSs at the same time, the available wireless communication pathway is divided up according to the protocol. A given protocol might have the available wireless communication pathway divided up by frequency, time, code or more than one of those. This allows multiple users to share the same wireless communication pathway.

For example, with a Time Division Multiple Access (TDMA), the BTS and the multiple MSs agree on the division of time periods into timeslots (or "burst periods") and where a first MS might interfere with a second MS, the first MS is assigned a first timeslot and the second MS is assigned a different timeslot of the available timeslots. Since different MSs use different timeslots (and they all agree on timing sufficiently well), they can share a common carrier frequency and their respective transmissions do not interfere. An example would be where there are eight timeslots of 576.92 µs (microseconds) each for each frame and so an MS assigned the first timeslot will perhaps transmit a number of bits during the first timeslot, stop transmitting at or before the end of its timeslot, remain silent, then during the first timeslot of the next period, continue transmitting, if desired. Similar allocations occur for a MS to determine when it is to listen for something from a BTS (and for the BTS to determine when it is to start transmitting that data).

Thus, using a single carrier frequency, each transceiver of a BTS can communicate with up to eight MSs and communications to those MSs is grouped into a TDMA frame and transmitted on the downlink channels that use that carrier frequency channel. The timing is such that each of those MSs can communicate in their respective timeslots to the BTS on the uplink channels that use that carrier frequency channel. This is referred to as a "TDMA frame" and the data rate over all eight MSs using that carrier frequency is 270.833 kilobits/second (kbit/s), and the TDMA frame duration, in either direction, is 4.615 milliseconds (ms).

Frequency Division Multiple Access (FDMA) is another way to divide up and allocate the available wireless communication pathway. With FDMA, the spectrum bandwidth available or allocated for the wireless communication pathway is divided up into different channels by carrier frequency. A first MS might be assigned one carrier frequency and a second MS might be assigned another carrier frequency, so that both can send or receive to or from one BTS simultaneously.

In the above examples, a plurality of mobile stations communicate with a BTS perhaps simultaneously, wherein communication between the BTS and a specific MS comprises sending information in a signal from the specific MS or from the BTS such that collisions of wireless signals are avoided, by having the BTS and the specific MS agree on which timeslot of a plurality of timeslots is to be used (TDMA), and/or agree on which carrier frequency of a plurality of carrier frequencies is to be used (FDMA). These are examples of multiple-access communications.

In another type of multiple-access communication, called "Orthogonal Frequency Division Multiple Access" (OFDMA), mobile devices are assigned subsets of subcarriers, where orthogonal narrow frequency subchannels are assigned to mobile devices for more efficient use of allotted spectrum compared to FDMA.

In some frequency allocations, the allocation is per channel block, where a channel block is a set, or group, of bidirectional channels, wherein each bidirectional channel uses an uplink carrier frequency for an uplink subchannel and a downlink carrier frequency for a downlink subchannel. The channels might be grouped together into sets of two or more channels based on some logic for classification such that each set shares a common identifier or attribute.

In some protocols, the spectrum is divided into subspectra for carrier frequencies and also the periods are divided into timeslots. Typically, the BTS includes logic to determine which channels to allocate to which MSs. In assigning a channel for use by a MS, the BTS might assign a particular transceiver to use a particular carrier frequency and indicating to an MS that it is to use that particular carrier frequency and also indicate which timeslot to use from a frame transmitted/received using that carrier frequency. The channel might comprise an uplink subchannel and a downlink subchannel. It may be that a given transceiver-MS communication uses more than one channel, e.g., more than one carrier frequency and/or more than one timeslot, but in many examples herein, the protocol is illustrated as being with respect to a MS that uses a channel comprising just one carrier frequency and just one timeslot.

In yet another example of multiple-access communications, called "Code Division Multiple Access" (CDMA), mobile devices might use the same timeslot and carrier frequency, but each mobile device is assigned a unique pseudorandom code to encode the signals to and from the BTS such that even when MSs simultaneously transmit using the same carrier frequency, or almost the same time, and/or the same timeslots, if those are used, applying the unique CMDA code allows for multiple transmitters to occupy the same time and frequency, as the receivers can separate out different receptions by decoding using the pseudorandom codes to decode each specific signal well enough for demodulation.

In effect, CDMA separates the channels not strictly by time or strictly by frequency. The use of CDMA results in a transmission of spread-spectrum signals, spread across a larger bandwidth than without encoding, by using a chipping rate that is faster than the signal bit rate. Thus, encoding signals with pseudorandom codes can replace the timing and frequency elements typically found in TDMA/FDMA protocols, as each code represents some element of articulation in both the time and frequency domain. In CDMA communications, signal propagation delay and timing between the MS and the BTS is understood and so the pseudo-random code is applied to a received signal across some number of bits/chips which, of course, occupy both some discretized span of the time domain and some discretized span of the frequency domain.

In some multiple-access protocols, more than one approach is used.

In GSM protocol digital mobile radiotelephone systems, MSs and BTSs leverage communications across both frequency and time division multiple access (FDMA/TDMA) channels such that MSs can share the same transmit and receive carriers via the assignment of distinct timeslots over each carrier frequency and each carrier frequency might be handled by a distinct transceiver or transceiver module or logic block.

In GSM, the BTS is responsible for assigning a timeslot to the mobile station (MS) when it requests access. In a GSM frame structure, there are eight timeslots within each TDMA frame. The number of carrier frequencies used can vary. In some regions, some carriers are licensed for a large number of carrier frequencies and MSs in those regions are configured to accept instructions to use one of as many as a thousand carrier frequencies (which a BTS would also support). For instance, in Europe the GSM 900 MHz spectrum band comprises 25 MHz of spectrum. If this is logically allocated into 200 kHz channels (e.g., each channel having a carrier frequency centered within the channel and the carrier frequencies each separated by 200 kHz so that a channel is associated with a 200 kHz subspectra band), and transceivers send signals on those channels, this provides for 125 channels. The use of guard bands (unused carrier frequencies) in the frequency domain might reduce this number, but might provide added reliability or ease of signal processing. Where a TDMA frame allows for eight timeslots, a BTS having sufficient numbers of logical or actual transceivers available, could support 8*125=1000 MSs channels simultaneously. With time division and frequency division, there can be guard slots and guard frequencies, respectively, so that one division has some separation from an adjacent division. With some protocols, more than one timeslot and/or more than one carrier frequency can be assigned to one MS, to provide greater bandwidth.

In some cases, there are multiple BTSs within range of supported MSs and so the support of the MSs can be spread among the BTSs and perhaps they coordinate so that adjacent BTSs avoid using the same carrier frequencies when possible. BTSs might be programmed to spread these frequencies across their towers with a specific reuse scheme. It might also be that a BTS is limited in the number of MSs it can support by the size of the pipe to the other network resources. In one example, a BTS uses from 1 to 15 carrier frequencies (i.e., its transceivers transmit using 1 to 15 carrier frequencies in sending/receiving frames, so it could support anywhere from 8 to 120 simultaneous users).

Each MS typically includes a processor, memory, radio circuitry, a power source, display, input elements and the like to perform its functions. The processor might read from program memory to perform desired functions. For example, the program memory might have instructions for how to form a data stream, how to pass that to the radio circuitry, how to read an internal clock to determine the value of a system clock to appropriately time listening and sending, and how to set appropriate frequencies for transmissions and reception.

Each BTS typically includes a processor, memory, radio circuitry, power source(s), interfaces to the telecommunications network, diagnostic interfaces and the like to perform its functions. The BTS processor might read from program memory to perform desired functions. For example, the program memory might have instructions for how to form a data stream, how to pass that to the radio circuitry, how to communicate with the telecommunications network, how to read an internal clock to determine the value of a system clock to appropriately time listening and sending, how to set appropriate frequencies for transmissions and reception, how to keep track of the various MSs and their state, location, allocation, etc. and perhaps store that into locally available memory.

In the manner described above, an MS will contact a BTS to get allocated some timeslots in frames in some carrier frequencies and the BTS will inform the MS of the MS's allocation. As both the BTS and the MS have the same system clock (or approximately so), they will communicate within their allotted timeslots and carrier frequencies. The assignment and communication of the assignments to the MSs might occur using a random access channel that is used by the MS to request an allocation. In the GSM protocol, this is referred to as a RACH process.

In the example of GSM, communication over the wireless communication pathway is parsed into TDMA frames of duration 4.61538 ms, with eight timeslots per TDMA frame. Each timeslot is long enough to hold 156.25 bits of data. In one application, the MS or BTS will transmit 148 bits of data in a timeslot, over 546.46 µs, with 8.25 bits (30.46 µs) of a guard time between timeslots. In the GSM900 Band, the wireless communication pathway has a bandwidth of 25 MHz in the uplink and downlink directions each, using the spectrum band of 890-915 MHz for uplink subchannels and the spectrum band of 935-960 MHz for downlink subchannels, providing for 125 carrier frequencies (125 carrier frequencies in each direction, spaced 200 kHz apart). With 200 kHz of guard separation on each side of each spectrum band, that leaves 24.6 MHz of spectrum, or 123 carrier frequencies, for moving data. The total capacity of such a wireless communication pathway (in both directions) would then be 156.25 bits per timeslot times eight timeslots per frame times 216.667 frames/second*123 carriers=33.312 Mbits/second.

Once a mobile device is assigned a channel and a timeslot, it can send bursts of data to the base station, perhaps by encoding around 156.25 bits of data by modulating its channel's carrier frequency signal using Gaussian Minimum Shift Key (GMSK) modulation. With GMSK, the modulated carrier frequency signal spreads out over 200 kHz, dropping in amplitude further away from the carrier frequency and having somewhat of a null 200 kHz away from the carrier frequency on either side.

The arrangement of terrestrial base stations are typically such that two mobile devices that are assigned the same channel and the same timeslot are separated enough that their communications with their respective base stations is separated by enough distance that the signal energy from one mobile device is greatly attenuated around the other mobile device's base station. The arrangement of "cells" allows for this. This might also provide separation for adjacent channels, so that mobile devices using the same timeslot and adjacent channels are separated geographically so that even as their energy is spread into the adjacent channel, it is attenuated.

It might be that not every base station allocates links on every channel. Since coverage areas of base stations would overlap to ensure continuous connections, adjacent base stations might coordinate so that they do not use the same channels. For example, if base stations are arranged geographically in a hexagonal pattern and the 123 channels are grouped into channel groups A, B, and C of 41 channels each, one base station could limit itself to assigning channels in channel group A, while its six closest neighbor base stations alternate among channel groups B, C, B, C, B, C. In that case, two adjacent base stations wouldn't use the same channels. In other arrangements, there are 7 or 9 channel groups and their reuse is coordinated among base stations. In the latter case, there is considerable separation between two base stations using the same channel group and so the signals from the base station and mobile devices having links to that base station are well separated from the other base station and the mobile devices it is supporting.

In the above approach, transmissions from mobile stations can be maintained with separation by timeslot, frequency, a geographical separation for terrestrial cellular communications, but if the same protocols are used for orbital mobile communications, it might be that the orbital base stations would have to contend with large numbers of signals from mobile stations that are communicating with nearby terrestrial cellular base stations, and due to an orbital base station's larger footprint, the orbital base station's transceiver picks up many more transmissions than a typical terrestrial cellular base station.

SUMMARY

An orbital base station (OBS) using protocols in common with terrestrial cellular base stations (TCBSs) receives signals from mobile stations, both those that are using links, or establishing links, with the orbital base station and those that are using links, or establishing links, with a terrestrial cellular base station. The orbital base station is communicating with, or initiating communications with, a target mobile station. The orbital base station processes a first received signal during a first period, a sounding period, and derives a sounding base signal. During the sounding period, the target mobile station is not sending a communication. During a second period, a signaling period, the orbital base station processes a second received signal at least including subtracting a representation of the sounding base signal from the second received signal to derive a filtered signal that is then processed to determine data being communicated by the target mobile station. This can be done even if there are many more mobile stations communicating with their respective TCBS while in a footprint of the orbital base station.

In yet another approach, the first received signal during the sounding period is distilled into a sounding base signal that collectively represents signals from a plurality of mobile base stations that are communicating with TCBSs using channels adjacent to, or within, a target channel that the orbital base station has assigned to the target mobile station. The sounding base signal is similarly subtracted from the second received signal to cancel out, or mostly cancel out, those signals destined for the in-footprint TCBSs to make it easier to decode the communications from the target mobile station.

In some variations, the sounding period and the signaling period are both timeslots in a frame and in other variations, the sounding period is a timeslot in one frame and the signaling period is a timeslot in an adjacent frame. In some variations, the sounding period is not always the same timeslot. For example, the sounding period might be timeslot 0 of frame N and the signaling periods are timeslots 1-7 of frame N, one sounding period might be timeslot 0 of frame N for the signaling period of timeslot 0 of frame N+1, another sounding period might be timeslot M of frame N for the signaling period of timeslot M of frame N+1, the sounding periods might be timeslot 0 of frame N, then timeslot 6 of frame N+4 with the other timeslots being signaling periods, or some other variation. In some cases, the statistics over the in-footprint mobile stations communicating with TCBSs might be such that collectively, the output from timeslot to timeslot is similar enough that different variations of sounding periods and signaling periods might be sufficient for use.

In various examples, the sounding period is illustrated as preceding the signaling period, but the signaling period could come before the sounding period, although this might delay processing of the desired signal until after the sounding period is complete.

In some implementations, a central communication management system might manage both TCBSs and orbital base stations and coordinate so that when the central communication management system determines that an orbital base station would have a particular footprint, it might direct an orbital base station to use a first set of frequencies and/or a first set of timeslots and direct the TCBSs that are in that footprint to use a second set of frequencies and/or a second set of timeslots, so as to reduce interference. The central communication management system might also manage frequencies such that there are unused frequencies between the first set of frequencies and the second set of frequencies.

The central communication management system might be implemented as part of the orbital base station, in the ground environment, or both. The space and ground segments of the networks might each have their own core network, or central communication management system, that connects, communicates, or cooperates with each other to accomplish these functions.

Other methods of generating the sounding base signal could be used instead of, or in addition to, those above in order to generate a sounding base signal that represents, or models, a profile of the interference/RF that mobile stations communicating with their TCBSs would impose on signals received at an orbital base station from mobile stations that are communicating with the orbital base station using a protocol that is in common with the mobile stations communicating with their TCBSs.

It is also possible that the interference signal energy being profiled is not entirely of a standard protocol. It might comprise signals generated using different types of protocols, as in the instance of a cross-border satellite footprint, wherein one protocol and one portion of the spectrum might be used on the one side of a border while one protocol and one portion of the spectrum might be used on the one side of a border while another protocol and another portion of the spectrum is used on the one side of a border and both portions are received at the orbital base station. Each side may be different, perhaps as a result of different licensing/allocation of the spectrum for different uses. It could also be because the spectrum is allocated to different mobile network operators that use the frequencies for different communications technologies (e.g., LTE, CDMA, GSM, etc.) where modulation schemes, bit rates, channel bandwidths, etc. are not always the same.

In a specific embodiment, a difference between the sounding period and the signaling period is that in the sounding period there are no signals received at the orbital base station that correspond to communications that the orbital base station needs to process, but include signals received from mobile stations communicating with their TCBSs on the surface, among other interference, whereas during the signaling period, there are signals received at the orbital base station that correspond to communications that the orbital base station needs to process along with a similar interference profile described above that might be exhibited in the sounding period.

The sounding process might be repeated over additional sounding periods, in part to account for changing conditions. The sounding process (and also the signaling process) might be done by obtaining an RF signal, converting it to a baseband relative to one or more carrier frequency to obtain a baseband analog signal, digitizing the baseband analog signal, and using digital signal processing techniques to manipulate the digitized signal to generating the sounding base signal. For example, Fourier transforms, such as via a Fast Fourier Transform (FFT) method, might be used to convert from the time domain to the frequency domain, and corresponding inverse Fourier transforms, such as via an Inverse Fast Fourier Transform (IFFT) method, might be used to convert from the frequency domain to the time domain. Various appropriate sampling rates might be used in digitizing the baseband analog signal.

However obtained, the sounding base signal is generated, it can be processed before using it in combination with the second received signal received during the signaling period. For example, it might be processed in the frequency domain to attenuate frequencies far from the baseband frequency of the second received signal. The combination of the sounding base signal and the second received signal can be by subtracting the sounding base signal from the second received signal or by inverting the sounding base signal and then adding it to the second received signal. The sounding signal might be sampled more than once and recorded as a separate vector of amplitudes and phases that represent the waveforms in that bandwidth sample.

In these manners, the effective SINR of the second received signal can be improved, facilitating an orbital base station in communicating with mobile stations that are transmitting to the orbital base station using the same or similar protocol, frequency ranges, timeslots, etc. as mobile stations that are within a footprint of the orbital base station but are communicating with TCBSs and have some of their transmitted energy impinging on a receiver of the orbital base station.

BRIEF DESCRIPTION OF THE DRAWINGS

Various embodiments in accordance with the present disclosure will be described with reference to the drawings, in which:

FIG. 1 is an illustration of an orbital base station over a terrestrial surface having TCBSs and mobile stations within a footprint of the orbital base station with some of the mobile stations communicating with a TCBS and other mobile stations communicating with the orbital base station, each using a common protocol and/or common range of frequencies, timeslots and the like.

FIG. 6A illustrates uplink transmissions from mobile stations to a base station, while FIG. 6B illustrates downlink transmissions from a base station to mobile stations.

DETAILED DESCRIPTION

Figure 1:
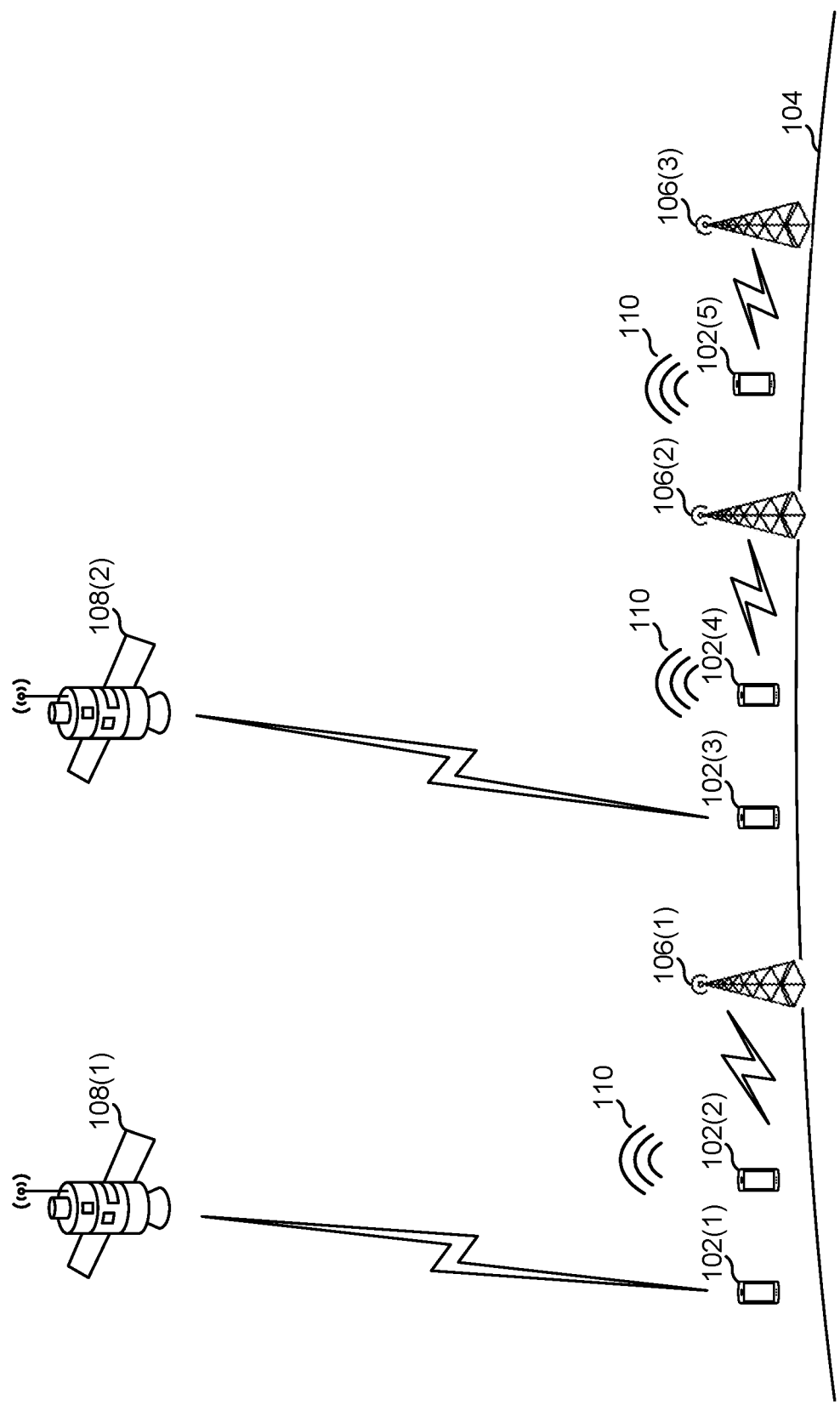

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Base stations in a wireless communications system can support multiple mobile stations in that they can correctly decode communications from multiple mobile stations and can transmit signals that respective mobile stations can correctly decode, even though there are many mobile stations overlapping and some base stations that overlap with other base stations. One or more of frequency division or time division can be used, as well as cellular division or carrier frequency re-use, where positions of various base stations and power levels used are such that communications between one mobile station and one base station do not interfere with communications between another mobile station and another base station.

An orbital base station might be one function of a satellite. The satellite, since it operates across such a wide coverage area, it might also have infrastructure on orbit corresponding to core infrastructure of a cellular network, such as in the case of a GSM/GPRS network, operating as a "network-in-a-box" where it employs BTS, BSC, MSC (perhaps G-MSC), VLR, HLR, EIC, AuC, etc. functionalities.

Where terrestrial base stations and orbital base stations are both used and might be in range of some common set of mobile stations, and the mobile stations use the same protocol or similar protocols to communicate with terrestrial base stations and orbital base stations, problems can arise in receiving signals at an orbital base station. There could also be terrestrial devices that do not use the same protocol but operate within the satellite footprint, perhaps as a result of difference in spectrum/frequency allocation across borders and/or use of spectrum/frequency in an unlicensed/unregulated/illegal manner.

Terrestrial base stations and the mobile stations using those terrestrial base stations can use lower power relative to orbital base stations due to the differences in distances (such as 35 km for terrestrial and 500 km for orbital) so the coverage area of one terrestrial base station does not overlap that many other coverage areas. Orbital base stations also have much larger footprints because they have much wider geographical areas of view as their line of sight to a horizon is much longer than for a terrestrial tower.

Additionally, with an orbital base station, higher power is required and so the coverage area within which mobile stations transmissions are heard by the OBS is much greater. This could be easily solved by requiring mobile station-to-OBS communications to use different hardware than terrestrial communications, different spectra, or the like. However, that can be undesirable when wanting to implement a cellular communications network wherein mobile devices can connect to an OBS in the same manner as a terrestrial base station. As used herein, "TCBS" refers to a terrestrial cellular base station, which is a base station that has limited coverage and other base stations take up for other coverage area, thus creating "cells" of coverage. In examples described herein, ORBs operate as base stations in orbit and appear to a cellular communications network's mobile stations (such as mobile devices, smartphones, etc.) as just a normal terrestrial cellular base station. This type of cellular infrastructure, or base station in orbit, is described in Speidel I.

Transmissions from mobile stations can be maintained with separation by timeslot, frequency, a geographical separation for terrestrial cellular communications, but if the same protocols are used for orbital mobile communications, it might be that the orbital base stations would have to contend with large numbers of signals from mobile stations that are communicating with nearby terrestrial cellular base stations, and due to an orbital base station's larger footprint, the orbital base station's transceiver picks up many more transmissions than a typical terrestrial cellular base station.

Transmissions from base stations are not as much of a problem for interference. Base stations listen on uplink channels and transmit on downlink channels. An orbital base station does not normally need to listen on downlink channels, so transmission from terrestrial base stations would not interfere with operation of an OBS. Also, transmissions to mobile stations are not normally a problem where both terrestrial cellular base stations and orbital base stations are in use. A mobile station will close a link with a closest base station and closeness relates to signal strength. If a mobile station is in an area with no terrestrial coverage, it will connect with an OBS and there would be little interference as other nearby mobile stations would also likely have no coverage and would connect with the OBS. If a mobile station is in an area with good terrestrial coverage, it will connect with a terrestrial base station that is closest and will ignore a relatively weaker OBS signal. In highly populated areas with infrastructure, a large majority of mobile stations may fall within range of coverage of a terrestrial base station and a small minority of mobile stations in lesser populated areas might require an orbital base station connection.

A difficulty can arise when an OBS is listening to uplink channels and encounters many (maybe thousands) of mobile devices that are communicating with terrestrial base stations yet the OBS receives some of their signal energy. With one or two such mobile devices, those can safely be ignored, but with thousands in an adjacent channel, that might spill over sufficient signal energy into a desired channel to raise the interference so that the signal-to-noise-plus-interference ratio (SINR) is too low to allow a receiver from demodulating a signal of interest within the channel of interest at a desired bit error rate.

The base station in orbit will be subject to RF signals from a large number of devices on the ground that are within its field of view, or footprint, and are operating across a swath of, potentially contiguous, carrier frequencies. Under this operating condition, the orbital base station might use a certain uplink carrier frequency that is adjacent to one, or more than one, uplink carrier frequency being used by base station infrastructure on the ground. In this case, the satellite receiver will be challenged to demodulate uplink signals on its carrier frequency of interest due to the excess interference. This is because carrier frequencies are reused abundantly among terrestrial base stations within the satellite footprint so adjacent carrier frequencies may comprise a significant number of RF signals from mobile devices on the ground. Spurious energy from adjacent carriers may create significant enough interference in the uplink carrier of interest to prevent signal demodulation.

There could potentially be a very large number of mobile stations within the OBS's footprint, however, that are radiating RF on uplink channels being used to communicate with the terrestrial base stations in the communications network. Some of these mobile stations could be radiating RF in a channel that is adjacent to the uplink channel on which the orbital base station is expecting to receive signals. Since the large majority of mobile stations on the ground will be within coverage of terrestrial base stations, the number of signal bursts within those channels will significantly outnumber the number of signal bursts in the orbital base station channel of interest. When the orbital base station uplink channel, or set of channels, is adjacent to channel used by the terrestrial base stations, the signals within the channel of interest will be subject to a lot of spurious interference. This spurious interference will degrade the SINR on the OBS uplink channel and make signal demodulation challenging, or impossible.

Furthermore, there could be signal energy from carriers that are operating on the orbital base station uplink channel as well. In other words, there could be signal energy from carriers within the uplink channel of interest in addition to energy from adjacent channels. The techniques described herein can reduce interference. One method is to remove coherent energy in the channel of interest. In the examples herein, it might be assumed that there are multiple channels and, in each channel, communication occurs by modulating a carrier wave that has an unmodulated frequency that is centered, more or less, in the channel. Energy is then dispersed over the channel based on the modulation used and might extend beyond the nominal boundaries of the channel. Typically, for one signal on one channel, the bulk of the energy is within the channel boundaries so as to not overwhelm signals in adjacent channels.

In various examples herein, mobile devices are communicating with an OBS and mobile devices communicating with TCBSs such that the OBS sees a much wider population of mobile devices, in part because the OBS is operating from orbit and there is greater distance between the mobile devices and the OBS and TCBSs need only support a much smaller footprint. The examples herein that refer to OBSs might also be used in similar arrangements wherein a base station has a much wider population/footprint than the TCBSs but where the base station is not necessarily in orbit. It might be used in other situations where a wider population/footprint needs to be supported, such as supporting a huge stadium full of people, using an airplane as a base station, using a large tower as a base station and other scenarios. Thus, it should be understood that the examples herein might be extended as appropriate.

FIG. 1 is an illustration of an orbital base station over a terrestrial surface having TCBSs and mobile stations within a footprint of the orbital base station with some of the mobile stations communicating with a TCBS and other mobile stations communicating with the orbital base station, each using a common protocol and/or common range of frequencies, timeslots and the like. As illustrated there, terrestrial mobile stations, such as mobile devices 102, are in use on Earth surface 104. Some of these mobile devices, such as mobile devices 102(2), 102(4) and 102(5), are communicating with terrestrial cellular base stations 106, but also send signal energy 110 in the directions of orbital base stations such as orbital base stations 108(1) and 108(2). This can interfere with communications between other mobile stations and an orbital base station, such as mobile device 102(1) and orbital base station 108(1) and mobile device 102(3) and orbital base station 108(2). The mobile devices can have, or be, programmable transceivers. The OBS can have, or be, a programmable transceiver, as can the TCBSs.

GSM as an Example Protocol

The embodiments below are in an order in which the process may be implemented to better explain the details. One embodiment uses the GSM/GPRS protocol and a Fast Fourier Transform for interference signal characterization. Other embodiments may use other communications protocols such as LTE, EDGE, CDMA, etc. Other embodiments may use signal processing algorithms other than a Fast Fourier Transform.

GSM/GPRS is a time division multiple access (TDMA) and frequency division multiple access (FDMA) protocol. In GSM/GPRS, a plurality of mobile stations communicates with a base station, perhaps simultaneously, wherein communication between the base station and a specific mobile station comprises sending information in a signal from the specific mobile station or from the base station to avoid collisions of wireless signals. The base station and the specific mobile station agree on which timeslot of a plurality of timeslots will be used (TDMA) and which carrier frequency of a plurality of carrier frequencies will be used (FDMA). This is an example of a time division multiple access (TDMA) and frequency division multiple access (FDMA) protocol.

Figure 2:
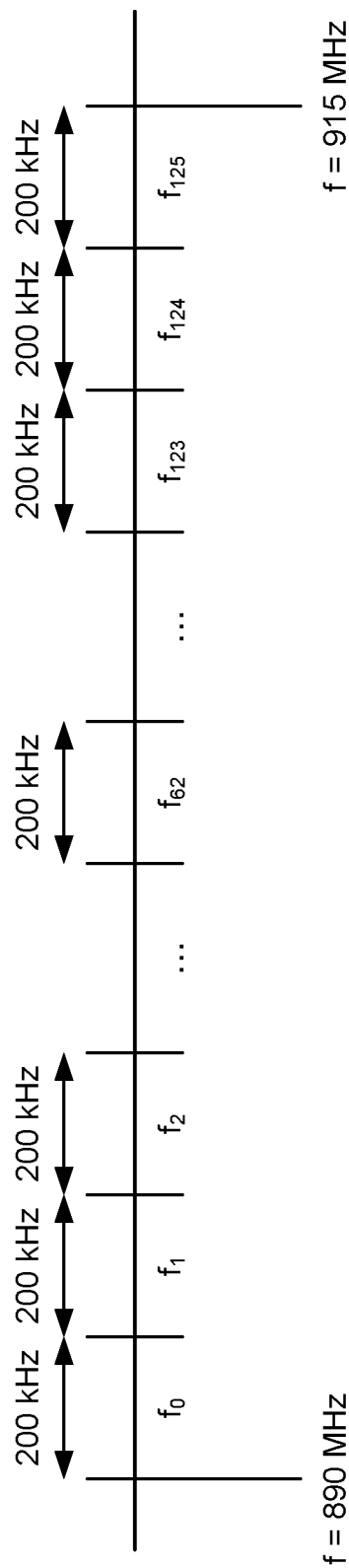
FIG. 2 is an illustration of frequency division of a spectrum into channels.

FIG. 2 is an illustration of frequency division of a spectrum into channels. As illustrated there, a predetermined, or agreed-upon, spectrum is divided into channels. In this example, there are 125 channels. Each channel is considered to be 200 kHz wide. While the signal in a channel is greatest within the bounds of the channel, it is not necessarily zero outside of the channel bounds.

In the GSM protocol, transceiver-mobile station communication involves frames that have up to eight timeslots. With eight timeslots, a transceiver sends out a frame that is directed at up to eight mobile stations, with each mobile station assigned a unique timeslot in the frame by the transceiver's base station. The mobile stations can send their transmissions in their allotted timeslot. Because the transceiver assigns each mobile station that is communicating a timeslot, similarly situated mobile stations can communicate back to the transceiver in their allotted timeslot. A transceiver might not use all eight timeslots.

In the GSM protocol, there are rules for spectrum band use, timing, encoding and conflict resolution. As a base station is likely to have to communicate with many mobile stations at the same time, the available wireless communication pathway is divided according to the protocol.

In GSM, for example, with Time Division Multiple Access (TDMA), the base station and the multiple mobile stations agree on the division of time periods into timeslots (or "burst periods"). To avoid interference between a first mobile station and a second mobile station, the first mobile station may be assigned one timeslot and the second mobile station may be assigned a different timeslot of the available timeslots. Since different mobile stations use different timeslots (and they all agree on timing sufficiently well), they can share a common carrier frequency and their respective transmissions do not interfere. As an example, if there are eight timeslots of 576.92 μs (microseconds) each for each frame, a mobile station assigned the first timeslot may transmit a number of bits during the first timeslot, stop transmitting at or before the end of its timeslot, remain silent, then during the first timeslot of the next period, continue transmitting, if desired. Similar allocations occur for a mobile station to determine when to listen for something from a base station (and for the base station to determine when it is to start transmitting that data).

Thus, using a single carrier frequency, each transceiver of a base station can communicate with up to eight mobile stations. Communication to those mobile stations is grouped into a TDMA frame and transmitted on the downlink channels using that carrier frequency channel. The timing is such that each of those mobile stations can communicate in their respective timeslots with the base station on the uplink channels that use that carrier frequency channel. This is referred to as a "TDMA frame". The data rate over all eight mobile stations using that carrier frequency is 270.833 kilobits/second (kbit/s), and the TDMA frame duration, in either direction, is 4.615 milliseconds (ms). Each TDMA frame, therefore, consists of 1,250 bits where each TDMA timeslot can carry up to 156.25 bits.

Description of the GSM/GPRS Frequency Structure

Frequency Division Multiple Access (FDMA) is another way to divide and allocate the available wireless communication pathway. The FDMA protocol divides the spectrum bandwidth available for wireless communication into different channels by carrier frequency. For example, a base station might assign a first mobile station one carrier frequency and assign a second mobile station another carrier frequency, so that both can send or receive to or from the base station simultaneously. In GSM/GPRS each carrier frequency occupies 200 kHz of bandwidth.

Globally, GSM/GPRS networks are allocated 4 bands: GSM850 Band, GSM900 Band, GSM1800 MHz Band, and GSM1900 Band. Each band is allocated some bandwidth for uplink and downlink carrier frequencies. For instance, in the GSM900 Band, the wireless communication pathway has a bandwidth of 25 MHz in the uplink and downlink directions each, using the spectrum band of 890-915 MHz for uplink portions and the spectrum band of 935-960 MHz for downlink portions, providing for 125 carrier frequencies (125 carrier frequencies in each direction, spaced 200 kHz apart). With 200 kHz of guard separation on each side of each spectrum band, that leaves 24.6 MHz of spectrum, or 123 carrier frequencies, for moving data. The total capacity of such a wireless communication pathway (in both directions) would then be 156.25 bits per timeslot times eight timeslots per frame times 216.667 frames/second×123 carriers=33.312 Mbits/second.

Description of Network Frequency Reuse Schemes

When deploying terrestrial communications networks, uplink and downlink carrier frequencies may be allocated to each base station such as to minimize interference. Each base station is deployed to provide coverage to a geographic area that is usually known. To ensure that mobile stations can transition or hand off from one base station to another, adjacent base stations are positioned close enough such that their coverage areas overlap slightly. This allows mobile stations to receive broadcast signals from multiple base stations when operating near an edge in the network. This helps avoid a mobile station disconnecting when performing a handoff or otherwise transitioning from base station to base station in the network.

Description of Carrier Signal Energy and Adjacent Channel Interaction

In a GSM/GPRS network, mobile devices and base stations articulate RF bursts using GMSK modulation. GMSK modulation, or Gaussian Medium Shift Keying modulation, is a continuous phase frequency shift keying modulation scheme in which the phase is changed between symbols and a constant signal amplitude envelope is maintained (reducing power constraints on transmitting mobile stations and base stations). A GMSK modulated signal is created, in simple terms, by putting an MSK (Medium Shift Keying) signal through a Gaussian filter.

The GMSK modulation used in the GSM/GPRS protocol has a 0.3 bandwidth-time product, which defines how the signal power profile, in dB, falls off, or decreases, as a function of the ratio between frequency offset from the carrier and the signal bit rate, $f_{off}/R_b$, where $f_{off}$ is the frequency offset from the carrier and $R_b$ is the bit rate. As the bandwidth-time product decreases, the signal energy falls off more quickly. This creates a narrower signal energy profile as a function of frequency and that helps to mitigate interference between adjacent carrier frequencies. Specifically, $BT=f_{-3\ dB}/R_b$, where BT is the bandwidth-time product, $f_{-3\ dB}$ is the frequency offset from the carrier frequency that has a signal power level −3 dB down from the carrier frequency, and $R_b$ is the signal bit rate at $f_{-3\ dB}$.

The bandwidth-time product of a GMSK signal is also related to how the signal pulse is spread over time during transmission. As the bandwidth-time product decreases, the time over which a signal is spread during transmission increases. A longer transmit time for each pulse can create interference between consecutive symbols that are transmitted within the same burst. As a result, the bandwidth-time product used in the communication chain carries a sensitive balance that trades spectral interference challenges for symbol interference challenges, and vice versa. In the case of GSM/GPRS, the bandwidth-time product is 0.3 so symbols are pulsed over approximately 3 bit periods centered about the bit that the pulse seeks to represent.

Figure 3:
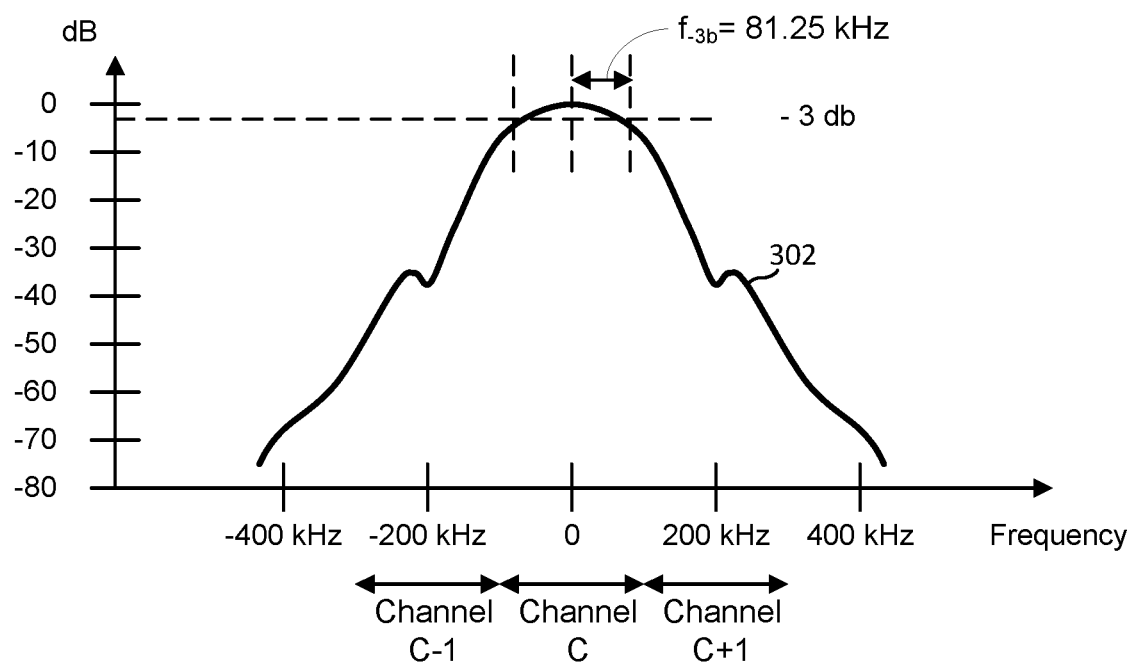
FIG. 3 is a plot of signal power of a GMSK modulated RF signal as a function of frequency around its channel's carrier frequency.

FIG. 3 illustrates a GMSK modulated GSM/GPRS signal 302 in the frequency domain as a function of frequency around its channel's carrier frequency. GSM/GPRS uses GMSK modulation with a bandwidth-time product equal to 0.3. With a bit rate of 270.833 kbps, the signal drops in power by half or more (−3 dB) at frequencies that are outside of the range of the carrier frequency +/− the −3 db frequency ($f_{-3\ db}$), which in this case is 81.25 kHz. In FIG. 3, the signal energy level is defined relative to the peak of the carrier signal. In a typical signal in a GSM channel, the peak of the signal energy is at the channel's carrier frequency and drops off to around −9 dB at 100 kHz away from the carrier frequency on either side, and around −41 dB at 200 kHz away from the carrier frequency on either side. This latter distance, 200 kHz, is the distance to the next channel's carrier frequency, so adjacent channel interference is around −41 dB and can often be easily handled. This is illustrated in FIG. 3, with one channel labeled "Channel C" and the adjacent channels labeled "Channel C−1" and "Channel C+1".

Figure 4:
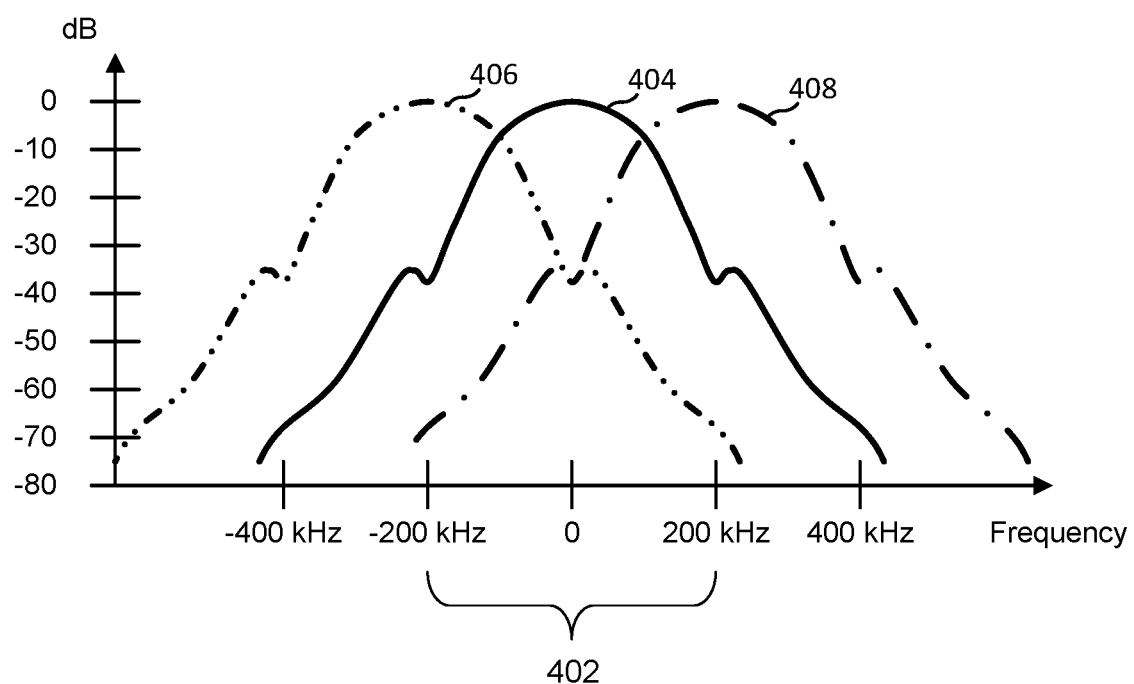
FIG. 4 is a plot of signal power of a GMSK modulated RF signal as a function of frequency around a channel's carrier frequency for one GSM/GPRS signal on one channel and for two adjacent GMSK modulated RF signals on adjacent GSM/GPRS channels.

FIG. 4 is a plot of signal power of a GMSK modulated RF signal as a function of frequency around a channel's carrier frequency for one GSM/GPRS signal on one channel and for two adjacent GMSK modulated RF signals on adjacent GSM/GPRS channels. FIG. 4 illustrates how adjacent carrier frequency signals, when received at the same time, may avoid interference with each other. When sent according to the protocol specified in the GSM/GPRS specification, interference from adjacent channels is low. In FIG. 4, a channel 402 carries the bulk of the energy of a modulated signal centered around a carrier frequency with a frequency distribution 404 relative to energy from adjacent channels, which have modulated signals centered around their carrier frequencies with frequency distributions 406, 408. The spurious energy from the adjacent channel's signals is reduced by nearly −40 dB at the carrier frequency. The GSM/GPRS specification requires the carrier to interference ratio to be 9 dB in order to pass clear voice traffic.

Figure 5:
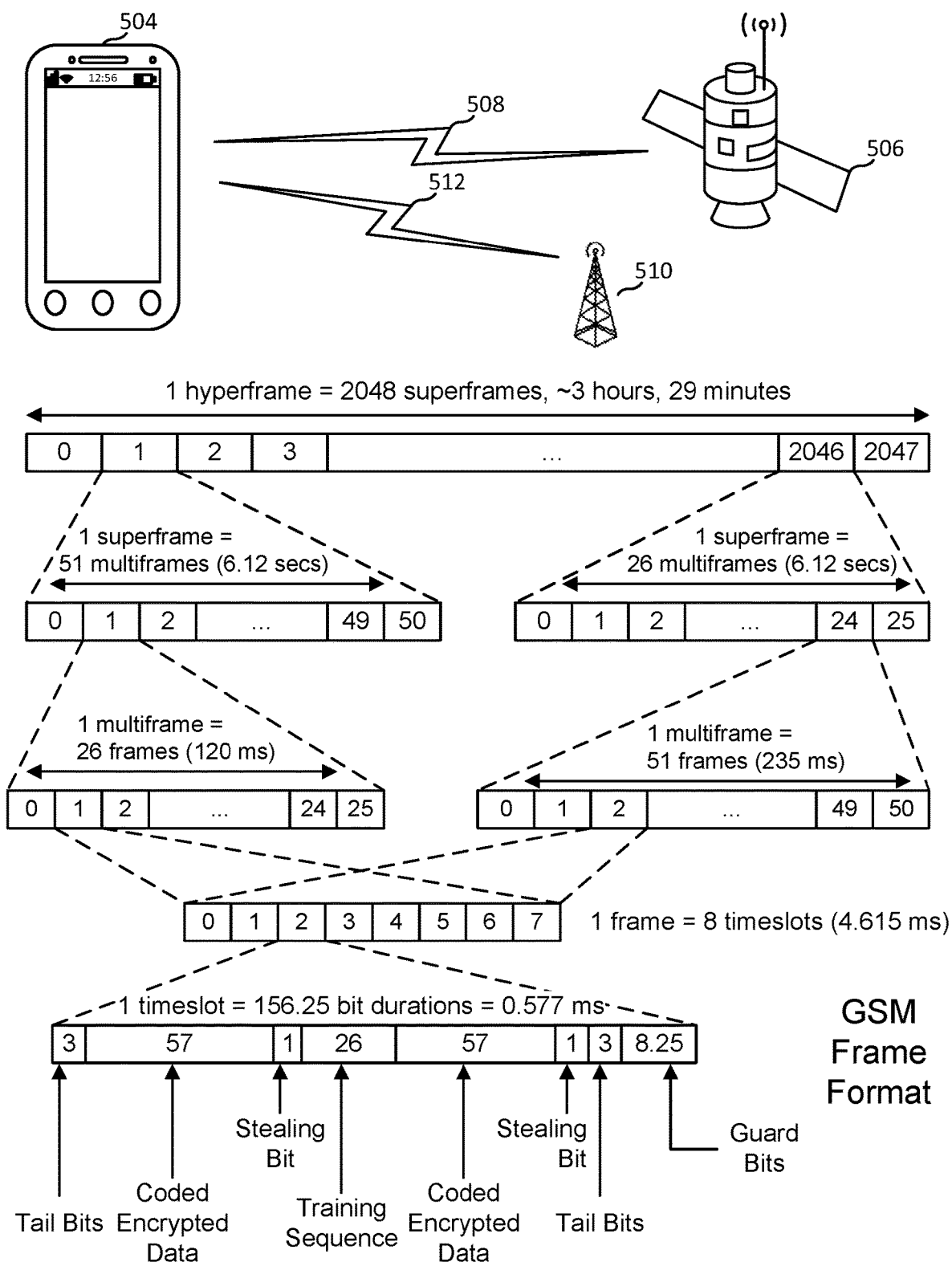
FIG. 5 illustrates the GSM/GPRS frame structure, which is a TDMA/FDMA protocol that might be used by a mobile station for communicating either with a TCBS or an orbital base station.

FIG. 5 illustrates how the GSM/GPRS protocol uses a frame-based structure to handle communications between an orbital base station 506 and mobile station 504 over ground-to-orbit link 508 and a terrestrial base station 510 and mobile station 504 over ground link 512. A TDMA frame is 4.61538 ms in duration and contains eight timeslots. Each timeslot is 576.92 microseconds in duration and a modulated signal sent during one timeslot might encode for up to 156.25 bits.

Figure 6:
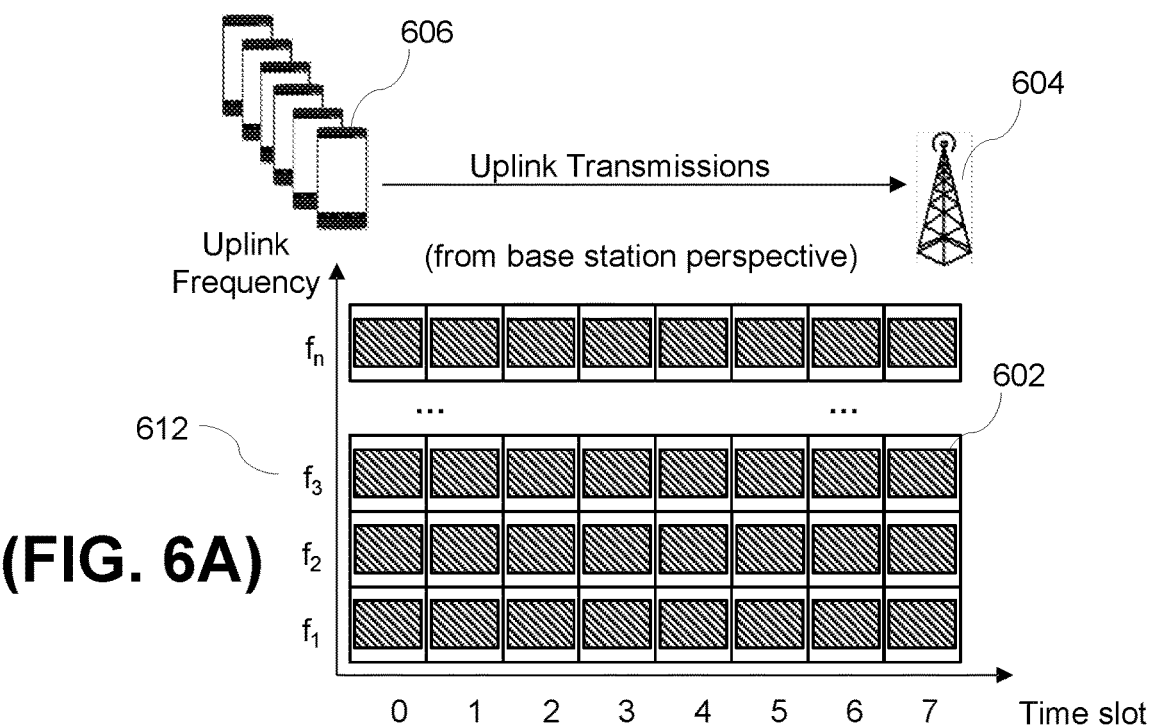
FIG. 6 illustrates how RF traffic might be shared across channels/carrier frequencies and timeslots in a telecommunications network.
Figure 6:
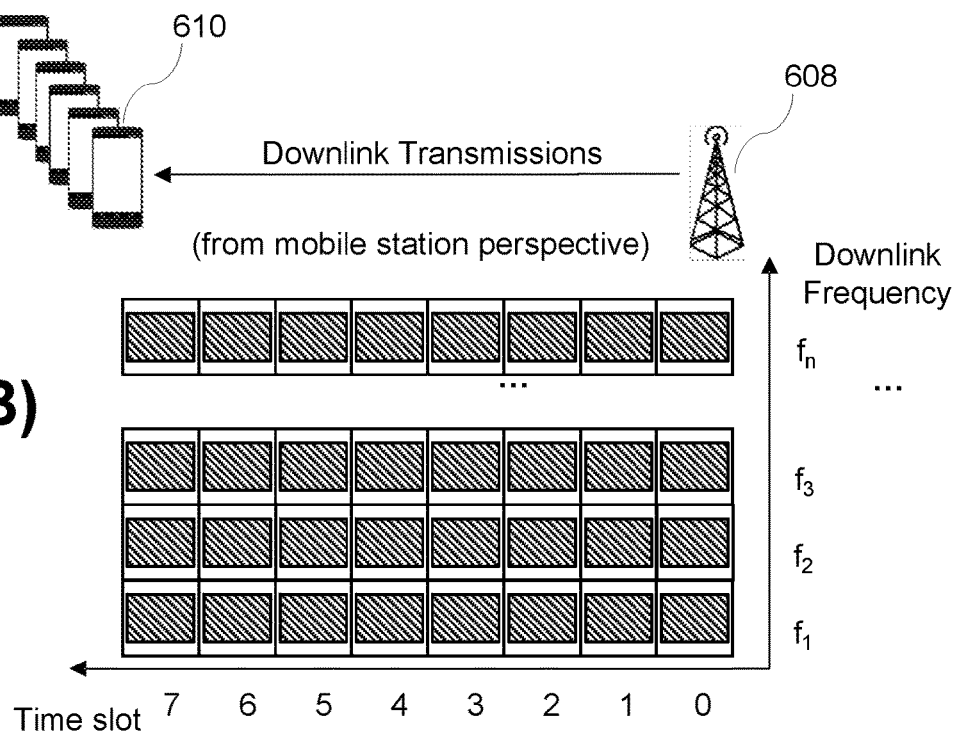

A GSM/GPRS network is designed to handle RF traffic simultaneously across contiguous carrier frequencies, spaced 200 kHz apart, with divisions by timeslot within each carrier frequency. The movement of this traffic is illustrated in FIG. 6, with FIG. 6A illustrating uplink traffic from mobile devices 606 to a base station 604 and FIG. 6B illustrating downlink traffic from a base station 608 to mobile devices 610. As shown, one dimension is carrier frequency and the other dimension is time. Each carrier frequency, such as carrier frequency 612 can accommodate eight mobile devices, each using one of the eight timeslots. In each timeslot, there is an RF signal burst, such as RF signal burst 602. FIG. 6 depicts how the signal energy of adjacent carrier RF signals might be perceived by a hypothetical terrestrial base station.

Figure 7:
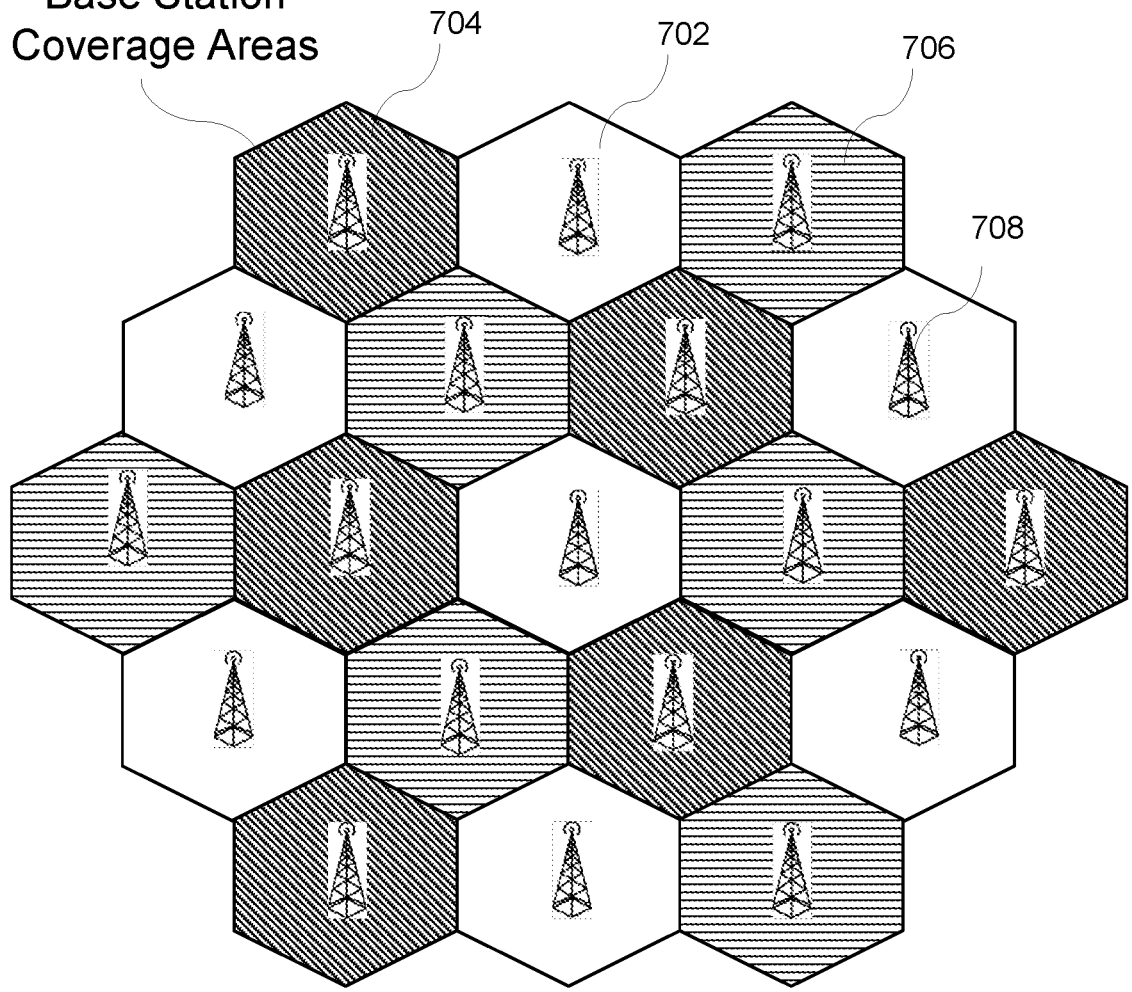
FIG. 7 illustrates a terrestrial cellular base station network and how channels on that network might be reused between adjacent base stations within the network.
Figure 7:
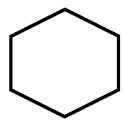
Figure 7:
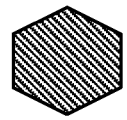
Figure 7:
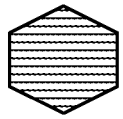

FIG. 7 illustrates the allocation of uplink and downlink channels/carrier frequencies to base stations in a GSM network, or other terrestrial cellular communications system, base stations provide service to mobile stations and each base station has a region (a space or area, depending on how it is considered) but is typically illustrated as a shape of an area on a surface over which the base station provides support. These might be circles, hexagons, or other shapes and might be circularly asymmetric due to terrain, interfering buildings or objects, and/or directionality of antennas. To provide continuous support for mobile stations and smooth handoff, the regions will usually overlap among the base stations. For the purposes of examples and illustrations herein, they are shown herein as nonoverlapping hexagons, but it should be understood that there may be overlap and they might not be so symmetric. Where base stations are evenly spaced and mobile devices are assigned to base stations strictly on a closest-distance basis, then the coverage areas might all be hexagons, but that is not a requirement. In general, the regions can often be described as having a radius of coverage more or less centered on a base station.

A base station might be part of a cell phone tower housing and powering base station transceiver equipment. In some cases, a base station might support distinct region sectors, perhaps somewhat overlapping, but perhaps pointed in different directions, via the use of directional antennas. Since mobile stations may move, the network design allows base stations to hand off connections of mobile stations as they move from region to region and thus their support moves from base station to base station. To ensure seamless handovers, base stations may be placed within close enough proximity of their neighboring base stations such that their coverage zones overlap slightly. This way, in the case of a handover, a mobile station can receive signals from more than one base station at once so that it knows to which base station it is being handed over.

Since neighboring base station coverage areas may overlap, the network can be designed to minimize interference between adjacent base stations and the mobile devices communicating with them. To accomplish this, neighboring base stations might refrain from using adjacent and/or common carrier frequencies over adjacent cells. Frequencies are allocated so that common frequency carriers, in both the uplink and downlink direction, are repeated far enough away from each other that mutual interference is minimized, with overlap minimized or avoided altogether. Channel reuse configurations might be dependent on coverage characteristics. In some configurations, channels/carrier frequencies are reused every 3, 7, or 9 base stations.

This is illustrated in FIG. 7. Cell tower base stations 708 provide service for defined coverage areas (three of which are labeled 702, 704, 706). The frequency reuse scheme defines how many base stations in a network reuse the same uplink and downlink carrier frequencies. A frequency reuse scheme of 3, for instance (as is shown in FIG. 7), reuses the uplink and downlink carrier frequencies every third base station in the honeycomb configuration, such that no base station with the same uplink and downlink carrier frequencies are directly adjacent to each other. Base stations with solid white coverage areas (e.g., coverage area 702), diagonal hatched coverage areas (e.g., coverage area 704), and horizontal hatched coverage areas (e.g., coverage areas 706) are each allocated a unique set of carrier frequencies (e.g., $f_1$, $f_2$, $f_3$; $f_4$, $f_5$, $f_6$; and $f_7$, $f_8$, $f_9$, respectively). Here, $f_i$ might represent the $i^{th}$ channel using the $i^{th}$ carrier frequency or the $i^{th}$ set of carrier frequencies (e.g., a channel comprises multiple carrier frequencies). The number of carrier frequencies that might be allocated to one base station, as an example, could be anywhere from 1 to 15. Frequency reuse schemes of 7 and 9 are also common.

Description of the Example Orbital Base Station

The GSM/GPRS specification reduces interference between adjacent terrestrial stations, but does not help a base station receiving a large plurality of signals from a large plurality of mobile stations in one or more adjacent carrier frequencies of one or more base station uplink carrier frequencies. For example, a GSM/GPRS base station operating in an orbital environment would have a coverage footprint that spans across a significant geographic area that might contain a significant number of terrestrial base stations.

Figure 8:
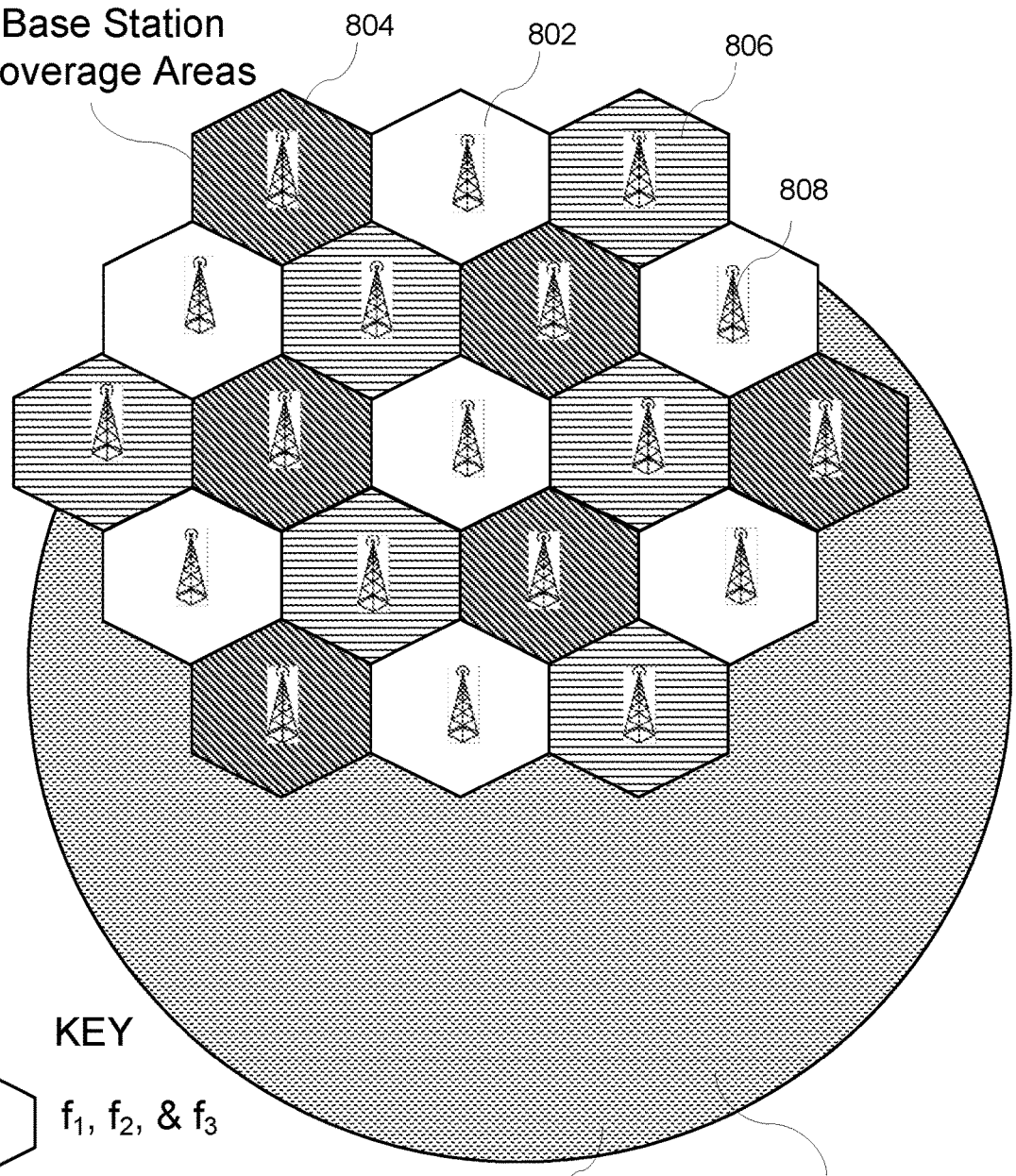
FIG. 8 illustrates how the coverage area, or footprint, of an orbital base station may overlap regions of operation of TCBSs.

FIG. 8 illustrates an example of the coverage an orbital base station might provide as a base station to a terrestrial communication network. Terrestrial towers, such as tower 808, would provide coverage in cells. As described above, the towers may be allocated different carrier frequencies, or carrier frequency sets, for their coverage areas, as indicated, such as coverage areas 802, 804, and 806. The orbital base station, which provides a wide radius of coverage 810, may be allocated its own unique carrier frequency or set of frequencies. From the downlink perspective, the orbital base station signals are originating from so far away that their energy level at the surface would be similar to the energy level perceived at the edge of a terrestrial base station counterpart. The result is that the satellite footprint provides coverage in areas where the terrestrial towers do not and does not interfere with existing terrestrial coverage. The carrier frequencies allocated to the orbital base station may be perceived as weaker than available terrestrial tower signals.

Figure 9:
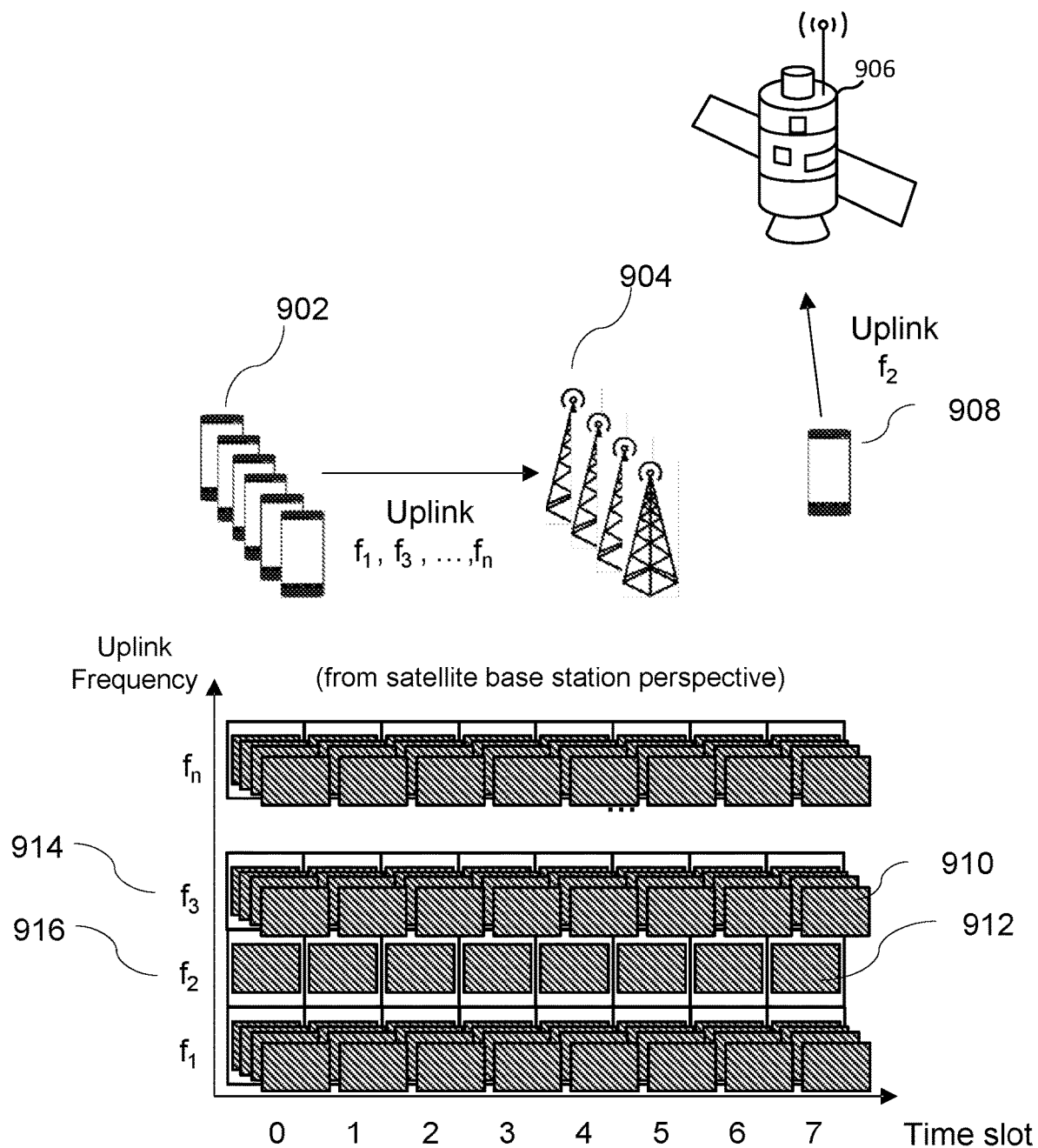
FIG. 9 illustrates how an orbital base station might perceive signals on its uplink carrier frequency channels relative to adjacent carrier frequency channels when the orbital base station has a dedicated carrier frequency channels and mobile stations using TCBSs use the adjacent carrier frequency channels.

The uplink direction of communications may present interference issues. FIG. 9 illustrates how an orbital base station might perceive traffic on the various carrier frequencies used by the network. Consider an orbital base station, 906, communicating mobile station 908 solely within its field of coverage (and not in coverage of a terrestrial base station) using a carrier frequency denoted $f_2$. Also within that field of coverage is a network of terrestrial base stations, 904, communicating with a plurality (perhaps thousands, or more) of mobile stations, 902, using a set of carrier frequencies denoted by $f_1, f_3, f_4, \ldots, f_n$. In this example, each carrier frequency is denoted in order such that $f_1$ and $f_3$ are the lower and upper adjacent carrier frequency neighbors to $f_2$. Since $f_2$, 916, is allocated to the orbital base station it is only being used by mobile stations communicating with that base station. In the case of this uplink carrier, each time frame is allocated to, at most, eight mobile stations on the ground which would fill eight timeslots within the frame, 912. However, $f_1, f_3, f_4, \ldots, f_n$ are allocated for use by a multiple terrestrial base stations communicating with multiple mobile stations on the ground that are within the orbital base station coverage footprint. Because of this, the orbital base station receives the aggregated signal energy of all RF bursts articulated on those carrier frequencies. For instance, $f_3$, 914, from the perspective of the orbital base station, comprises many, perhaps thousands, of RF signal bursts that overlap each other across the entire time frame, 910. As a result, the aggregated signal energy level of adjacent carrier frequencies, $f_1$ and $f_3$, could be significantly higher than the energy level of the signals from mobile stations communicating with the orbital base station using the carrier frequency of interest, $f_2$. In some cases, even non-adjacent channels can cause interference and that can be dealt with similarly.

Description of the Adjacent Carrier Frequency Interference

Coherent signal energy that creates interference may originate from anywhere in the frequency domain. Coherent signal energy from adjacent carriers may create interference on a particular carrier of interest, and coherent signal energy from other devices within the carrier of interest itself may also create interference.

The OBS takes advantage of the fact that the interference from the radiating energy below is relatively consistent in amplitude and phase over time, and nearly constant over very small amounts of time (such as the time of a GSM TDMA frame, 4.61538 ms). Although the satellite is moving very quickly in orbit, its position relative to signal sources is relatively consistent over short time frames. Furthermore, the majority of signal energy generating the interference environment will be coming from what can effectively be considered point sources in space. Most telecommunications traffic will radiate from population dense areas, or metropolises. Considering the example of New York, N.Y., USA, it covers about 780 square kilometers, which is about the area of a circle with a radius of 15 km. From an orbit of, say, 500 km, this 15 km radius circle on the ground would correspond to about one degree of angular offset from nadir. Furthermore, signals coming from each edge of the city would only need to propagate an additional 0.07 km (one-way) before hitting the spacecraft. This means that a bit that is radiated from the edge of the city will arrive about 233 nanoseconds after a bit that is radiated from the center of the city. This difference in time is about 6% of a bit period (which is 1/270.833 kbps=3.69 microseconds). Thus, the errant signals (i.e., signals picked up at the orbital base station that are between mobile devices on the ground and base stations on the ground) from that circle can be treated as all originating from a single point. With multiple such urban centers, each being treated as distinct single points, this may form an interference pattern of sorts, but as explained herein, that interference pattern would be expected to be not varying much over short timeframes.

Since there are a multitude of signals any given bit radiated from the city will be a 1 or a 0, represented by some phase of the carrier frequency at that bit. So the aggregate of RF signals coming from one city is effectively the same as two signals being radiated continuously on the same frequency but offset by a constant phase difference. As a result, each population center will generate interference that is coherent and since the distance between the satellite and each population center below it is about the same over very short periods of time, the amplitude of the signals generating this interference environment are relatively consistent.

The magnitude of this issue related to adjacent carrier frequency interference can be estimated with a set of assumptions and calculations. In one embodiment, the orbiting base station is assumed to operate in a circular orbit at 500 km. The coverage footprint of the orbital base station may be a near circular or other conic geographic section of the earth's surface. A typical coverage area for a communications satellite is related to the minimum elevation angle at which the satellite in orbit can create a sufficient connection with a mobile station on the ground. Devices located at a slant range farther than this elevation angle might be discounted as their signals would likely be significantly attenuated by antenna pointing offset losses.

The minimum elevation angle is defined as the angle above the horizon that the satellite must be in order for the mobile station to communicate with the orbital base station. For example, a minimum elevation angle of 90 degrees (where the satellite is substantially overhead and the mobile station is at the surface point in the direction of the nadir of the satellite) produces a coverage area of approximately a single point on the Earth's surface. When the elevation angle is lower than 90 degrees, the coverage area expands radially, or approximately so. For some minimum elevation angle at which a mobile station may communicate with the orbital base station, the angle will generally correspond to the longest supported distance for such communications.

The Earth central angle, $\lambda$, of a coverage area of an orbital base station is as shown in Equation 1, where $R_e$ is the radius of the Earth, $\varepsilon_{min}$ is the minimum elevation angle, and h is the satellite altitude.

$$\lambda = a\cos\left(\frac{R_e \cos(\varepsilon_{min})}{R_e + h}\right) - \varepsilon_{min} \quad \text{(Eqn. 1)}$$

For $R_e$=6370 km, $\varepsilon_{min}$=40 degrees, and h=500 km, the Earth central angle is around 4.74 degrees. The Earth central angle is the angle that defines the width of the conic section, or spherical cap, of the Earth's surface that the coverage footprint of the satellite is defined by. In other words, the Earth central angle is the radius of the satellite footprint, in degrees, relative to the center of the earth. The actual square kilometers of surface area of satellite coverage that is defined by this Earth central angle can be closely approximated by Equation 2.

$$A_f = 2\pi R_e^2 (1 - \cos(\lambda)) \quad \text{(Eqn. 2)}$$

When $R_e$=6370 km and $\lambda$=4.74 degrees, $A_f$ is around 872,700 km$^2$ for the coverage area of the footprint. The radius of this spherical cap may be estimated from the Earth central angle measured in radians times the radius of the Earth, or around 527 km. Meanwhile, the coverage radius of a terrestrial base station may be anywhere between 1 km and 35 km. In this example, assume a terrestrial base station with a coverage radius of 5 km. The coverage area of a terrestrial base station is also, technically, a small spherical cap on the Earth's surface. However, since the radius of coverage capability for a terrestrial cell tower is significantly smaller in magnitude compared to the radius of the Earth, the terrestrial base station coverage area can be approximated as a flat disk. Therefore, the coverage radius of a terrestrial base station can be closely approximated by the area of a circle of radius 5 km, or around 78.5 km$^2$.

The ratio of the satellite coverage area and the coverage area of a typical terrestrial base station provides a reasonable approximation of the number of terrestrial cells that would fit within one satellite footprint at one time; 872,700 km$^2$/78.5 km$^2$=11,118 terrestrial base stations per satellite footprint. This formula assumes that the satellite footprint area is completely saturated with terrestrial base stations. From an operational perspective, this might be an unusual case because one operating principle of the orbital base station might be to fill in the gaps of the terrestrial base station coverage areas. However, the orbital base station should be capable of providing coverage even in small gaps on the terrestrial base station coverage. This means that the orbital base station may, for some embodiments, be designed to sufficiently handle interference when its coverage footprint is even 99.9% saturated with terrestrial base station coverage areas.

In this example, the terrestrial base stations may use a carrier frequency reuse scheme of 3, which is the same as illustrated in FIG. 8. Also in this example, two of the carrier frequencies used in the network on the ground are adjacent to the carrier frequency used by the orbital base station. This is the same as the embodiment illustrated in FIG. 9 in which the orbital base station uplink carrier is flanked on both the upper and lower sides by uplink carriers that are used by terrestrial base stations. If each terrestrial base station is operating at full capacity (i.e., all timeslots within each TDMA frame are being used), we can approximate the number of RF bursts within each timeslot of each adjacent carrier as perceived by the orbital base station. Since every $3^{rd}$ terrestrial base station within the satellite footprint will use the adjacent uplink carrier from the perspective of the satellite, we can compute the number of simultaneous signal bursts by dividing the number of terrestrial base stations within the satellite footprint by 3: 11,118/3=3,706 simultaneous RF bursts per adjacent carrier. It should be noted that the orbital base station will actually be subject to more simultaneous RF bursts than 3,706 per adjacent carrier. The reason for this is because the satellite will have a view angle of the earth's surface well beyond the 527 km coverage radius previously calculated based on the minimum elevation angle. However, the communication capability of the orbital base station and mobile stations on the ground is limited to the 527 km radius of coverage because of, for example, the directivity of the antenna in use (on the satellite) and degradation of signals originating from low elevation angles. Signals originating outside of this 527 km radius footprint may therefore significantly attenuate whether or not they are interference signals or signals of interest. Therefore, in the following example, those signals are ignored in the interference analysis.

Figure 10:
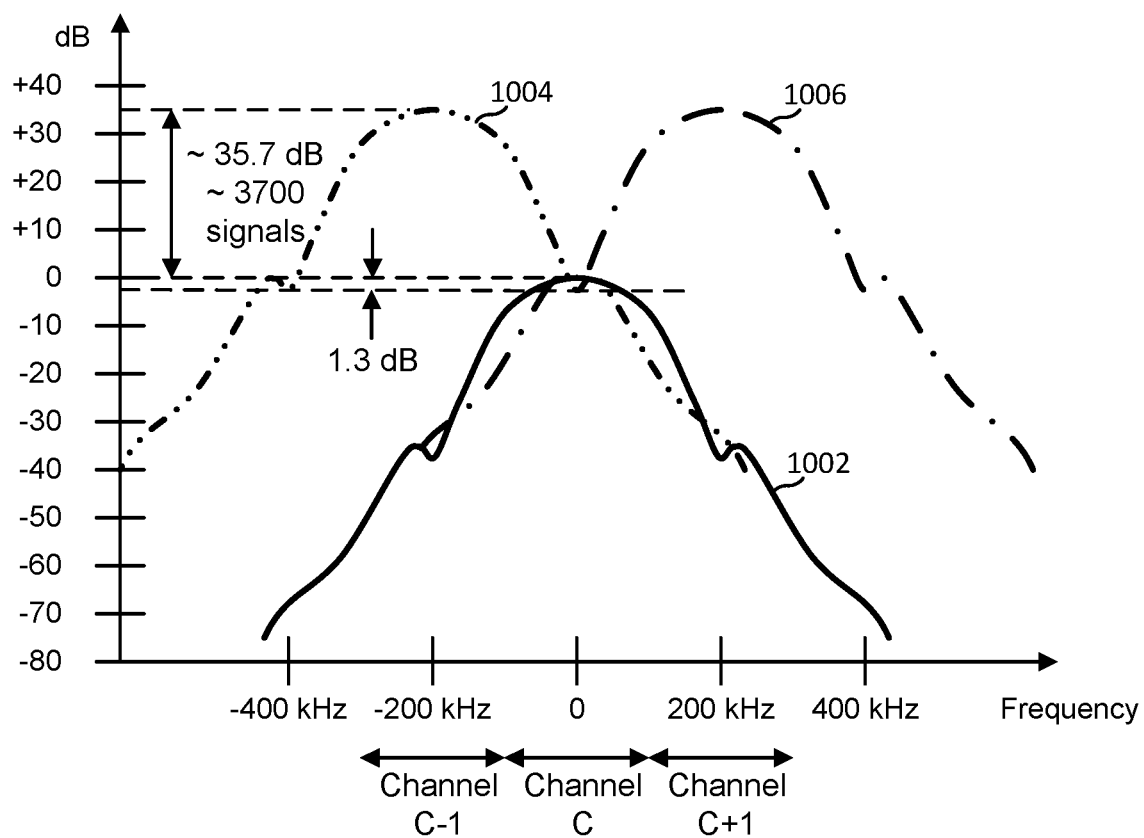
FIG. 10 illustrates the signal energy levels that an orbital base station might receive for the orbital base station's channel and adjacent neighboring channels, taking into account signals from a multiplicity of mobile stations that are communicating with the TCBSs, such as those TCBSs shown in FIG. 8.

FIG. 10 illustrates the signal energy levels that an orbital base station might receive for the orbital base station's channel (Channel C in the figure) and adjacent neighboring channels (Channels C−1 and C+1 in the figure), taking into account signals from a multiplicity of mobile stations that are communicating with the TCBSs, such as those TCBSs shown in FIG. 8, and adjacent carrier interference from the perspective of the orbital base station. The orbital base station uplink carrier frequency signal energy 1002, is $10*\log_{10}(3,706)$, or 35.7 dB lower than the signal energy from its adjacent carrier frequencies 1004 and 1006 because 1004 and 1006 may each comprise 3,706 simultaneous signal bursts while 1002 comprises, in this example, one single burst. Accounting for two adjacent channels, the energy is $10*\log_{10}(2*3,706)=38.7$ dB, so the SINR is around 40 dB−38.7 dB, or 1.3 db. The result is that the adjacent carrier frequencies carry enough energy to reduce the SINR ratio on the uplink carrier frequency to 1.3 dB.

Note that in a large urban area, approximately 3700 mobile stations communicating with their TCBSs can appear to an orbital base station as being in the same place and having the same propagation delay, or a small enough variation that it can be treated that way. This would mean that during a sounding period when communications to the orbital base station from mobile stations is on hold, the timing of the errant signals from those 3700 mobile stations is going to appear synchronized. Being synchronized, if they are all using the same protocol, with timeslots divided up into bit transmission periods, such as shown in FIG. 5, statistically half might be expected to be transmitting a zero and the other half transmitting a one. While the individual bits might change from bit sample time to bit sample time (in the example of FIG. 5, the bit sample time would be around 0.577 ms/156.25=3.7 μs), the errant ground signals picked up by the orbital base station may be statistically consistent from timeslot to timeslot and from frame to frame. This has its limits, of course, as the orbital base station after some minutes have passed would be encountering a different terrestrial situation.

The similarity between the sounding signal that is recorded during a sounding period (when there are no mobile stations trying to transmit to the orbital base station) that is caused by collective errant signals from large numbers of mobile stations communicating with their TCBSs on the ground and the collective errant signals that would occur during a sampling period (when there are mobile stations transmitting to the orbital base station) commingled with the desired transmissions to the orbital base station need not be exact. The better the match, the better a filtering out that can be performed, but it might be sufficient that the sounding signal in the sounding period be somewhat close to the errant signals during a sampling period, as it can be sufficient that the errant signals be reduced to the point where the orbital base station can still extract the desired transmissions.

In some embodiments, the transmissions to the orbital base stations are made to be distinct from the terrestrial base station communications, or are necessarily so. For example, at some distances at some times, the propagation delays of terrestrial errant signals result in them being different enough from the signals between mobile stations and the orbital base station that the errant signals in the sampled signal in the sampling period are distinct from the signals between mobile stations and the orbital base station. However, this might not be required.

Figure 11:
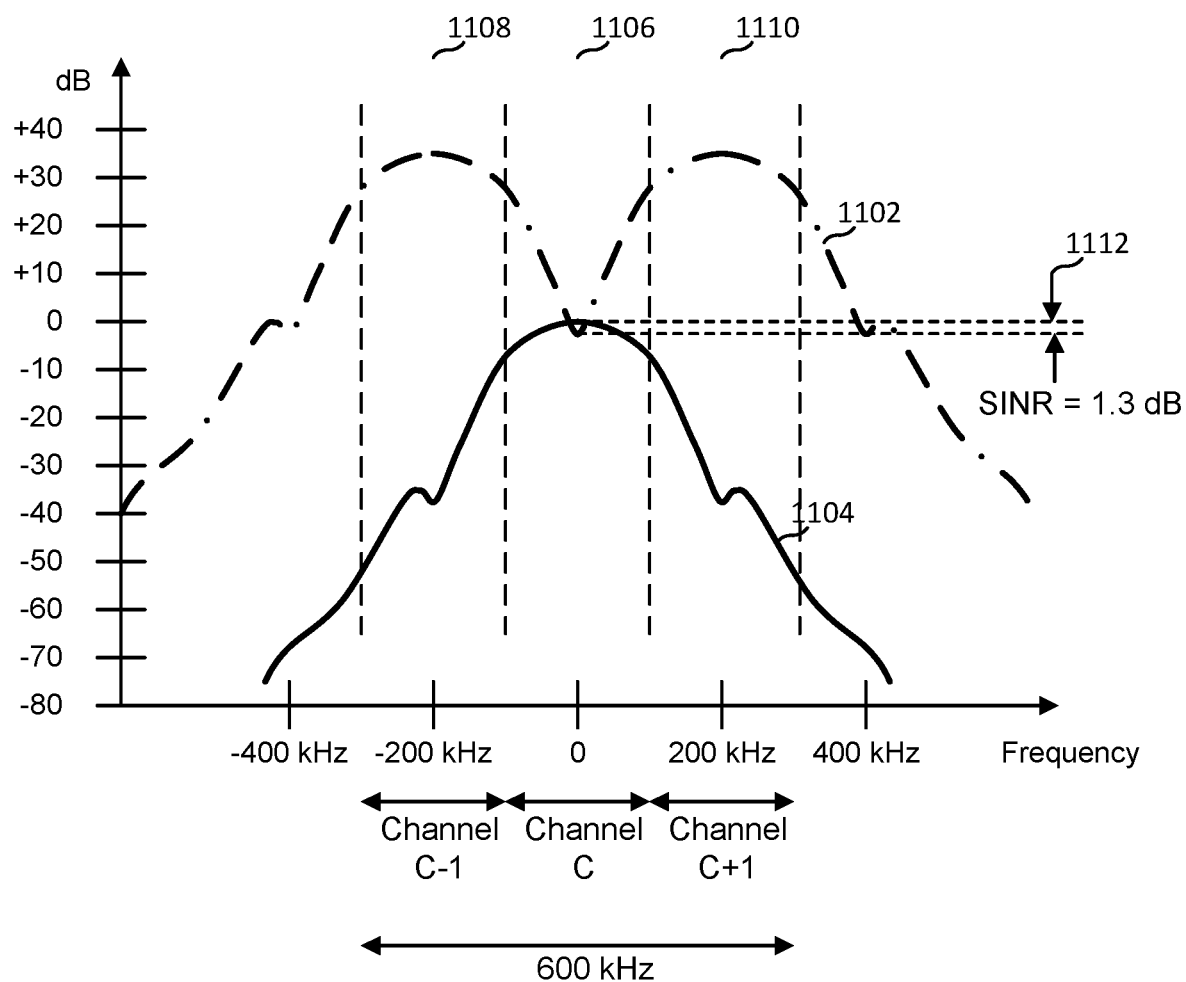
FIG. 11 illustrates a significant amount of RF signal energy in adjacent channels introducing significant spurious interference in a channel of interest such that a signal of interest in this channel is challenging to demodulate.

FIG. 11 illustrates how the problem of adjacent carrier interference could affect a GSM/GPRS base station's performance in orbit. The carrier frequencies, 1108 and 1110, for Channels C−1 and C+1, respectively, which are adjacent to the carrier frequency of interest, 1106 (the carrier for Channel C), are being used by a significant number of mobile stations in the terrestrial base station network. The result is that there is a high amplitude signal level, 1102, in the adjacent carrier frequencies, which creates interference within the carrier frequency of interest, 1104. As FIG. 11 suggests, the signal of interest may only barely exceed, if at all, the interference level at the carrier frequency of the channel of interest. In these scenarios, the SINR, 1112, is so low that demodulating the signal at a desirable bit error rate becomes challenging or impossible. In some applications, this is insufficient margin for GMSK signal demodulation at, for example, a GSM bit rate of 270.833 kbps with a reasonable bit error rate of, for example, less than 1%.

Digital Signal Processing

Figure 12:
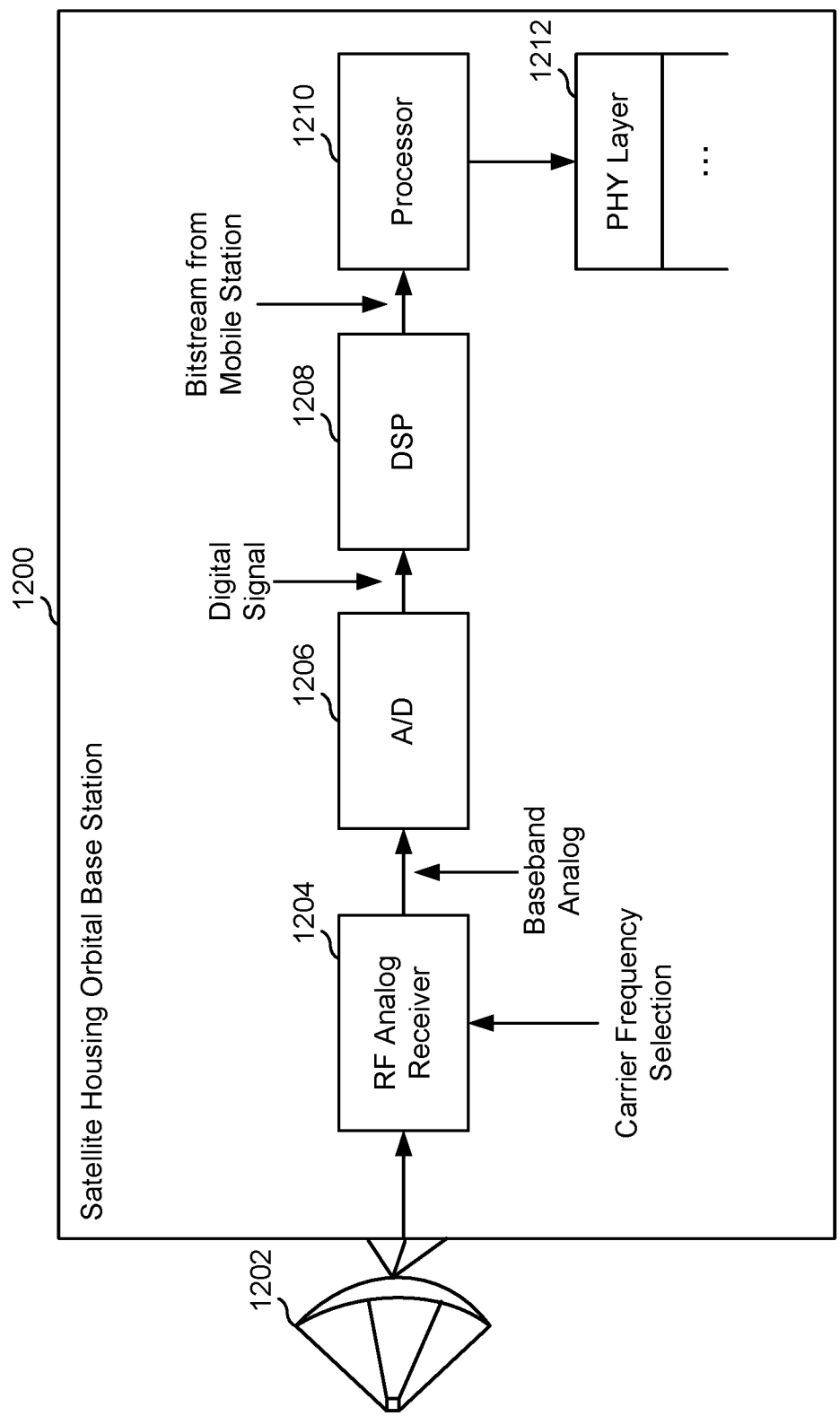
FIG. 12 is a block diagram of portions of a satellite that handles communications.

FIG. 12 is a block diagram of portions of a satellite that handles communications. As shown there, a satellite 1200 houses an orbital base station. An antenna 1202 receives signals from within a footprint as described elsewhere herein. Antenna 1202 provides an analog signal to an RF analog receiver 1204. The carrier frequency of interest is supplied to the RF analog receiver 1204. Note that there might be more than one of such receivers, one per channel, implemented in hardware and/or software. An output of the RF analog receiver 1204 is a baseband analog signal, which is supplied to an analog-to-digital converter (A/D) 1206. The digital signal is processed by a digital signal processor (DSP) 1208 that outputs a bitstream from a mobile station to a processor 1210 that can then process the binary code from the bitstream perhaps in a PHY network layer 1212 in a conventional manner.

In this manner, a multiple access transceiver, adapted for operation in Earth orbit and configured for communication with terrestrial mobile devices that are also capable of communicating with terrestrial base stations, receives a signal from some of terrestrial mobile devices, a filtering module reduces a portion of the signal due to a plurality of terrestrial mobile devices that are communicating with terrestrial base stations to produce a filtered signal comprising a signal from a particular mobile device communicating with the multiple access transceiver, and a signal demodulator demodulates the filtered signal to produce a demodulated signal corresponding to a signal from the particular mobile device.

Figure 13:
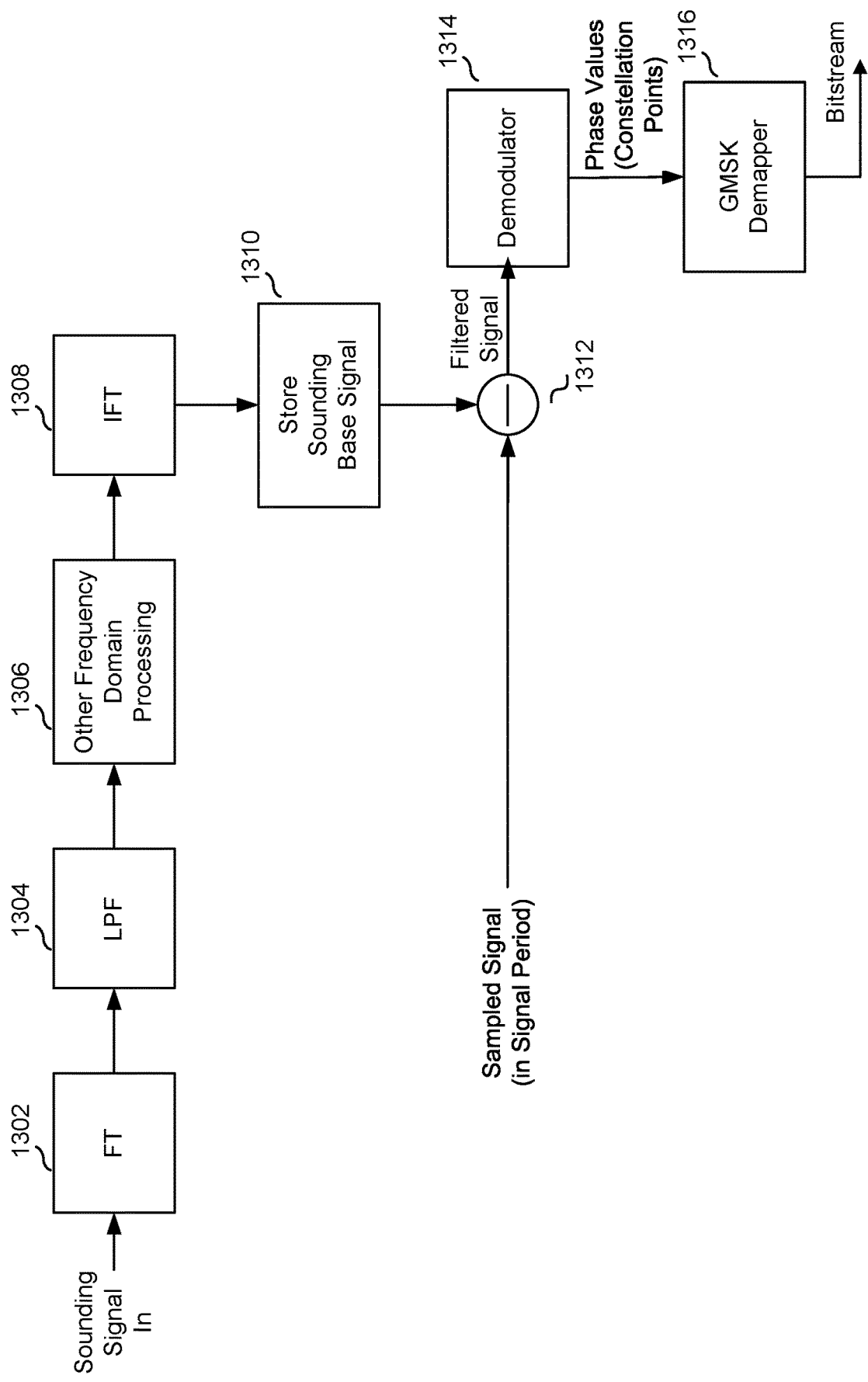
FIG. 13 is a schematic diagram of the DSP section of FIG. 12 in greater detail.

FIG. 13 is a schematic diagram of the DSP section of FIG. 12 in greater detail. As illustrated there, a sounding signal, as might be received from A/D 1206 (shown in FIG. 12) during a sounding period, is provided to a Fourier transform block 1302, which might be implemented in hardware or software. The output of Fourier transform block 1302 is provided to a lowpass filter (LPF) block 1304 that might attenuate portions of the signal that are too high frequency, which would correspond to portions of the signal that are in channels that are far from the channel of interest. An example might be a low pass filter of 600 kHz, which may be implemented digitally using a software defined radio or otherwise. Other frequency domain processing can be done at block 1306, such as effecting a complement by adjusting by the Fourier transform of negative one. The output of block 1306 is provided to IFT block 1308, which converts back to the time domain to provide for a sounding base signal. This can be stored for later use in storage 1310.

A later use is in a signal period, when a sampled signal (such as being sampled by A/D 1206 of FIG. 12) in the signal period is applied to an adder 1312 that adds the stored sounding base signal to cancel out the effects from unwanted signals to form a filtered signal. The filtered signal is then provided to a demodulator 1314 that outputs phase values (constellation points) to a GMSK demapper 1316 that outputs a bitstream that might form the output of DPS 1208 shown in FIG. 12.

In the present embodiment, a digital signal processing (DSP) step in the receiver chain mitigates the interference from adjacent carrier signal energy and increases the signal of interest SINR in the digital environment.

Description of Channel Sounding and Profiling RF Interference

The GSM/GPRS protocol uses 200 kHz wide carrier bandwidths that are segmented into TDMA frames, each comprising eight timeslots, or channels, per TDMA frame. In the example below, channel sounding (or sampling) is performed on the first timeslot within a TDMA frame, although channel sounding could be implemented on any timeslot or timeslots. The sounded timeslot is left unassigned to any mobile stations communicating with the receiver so that the receiver is only receiving interference signals and noise during that slot. This sounding procedure is done so that the receiver can generate a digital profile of the interference environment and use that profile to create an "out-of-phase" counterpart for the interference environment. This "out-of-phase" counterpart is then used to process the remaining timeslots in the TDMA frame to reduce the effect of adjacent carrier frequency interference and increase the SINR within the carrier frequency of the orbital base station. The process for how this "out-of-phase" counterpart for the interference environment may be used for multiple types of algorithms that can characterize a digital waveform. The amplitude measurement might be used to generate a base signal for interference reduction, in addition to the phase or instead of the phase.

The channel sounding, or sampling, process may be a sample of the desired carrier bandwidth and its adjacent carrier neighbors, possibly repeated more than once. In this embodiment, the first timeslot could possibly be long enough for multiple soundings, or samplings. Multiple measurements of the interference energy might better inform the out-of-phase counterpart created to mitigate interference. The more informed the model is, the better the interference mitigation can be.

Figure 14:
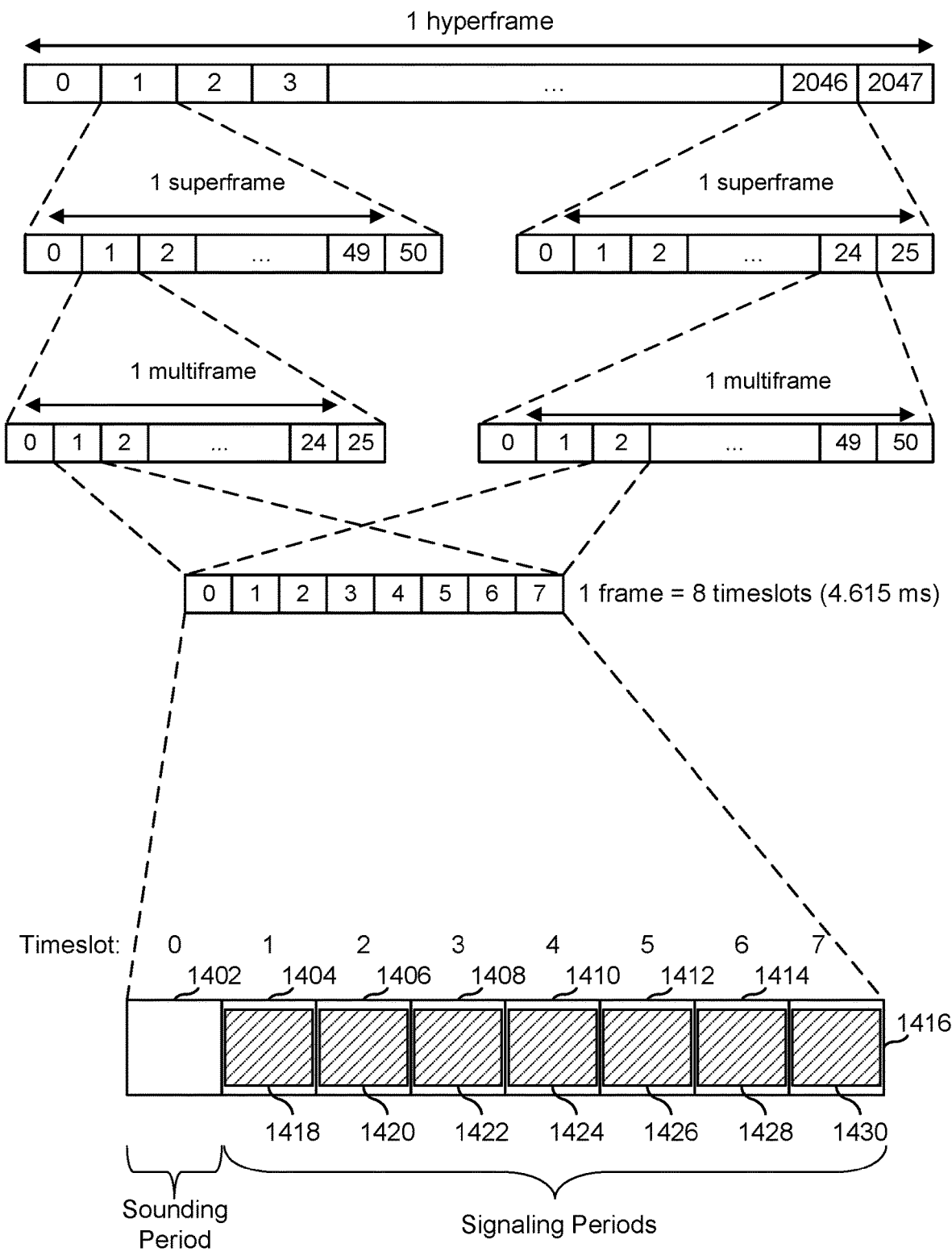
FIG. 14 illustrates where a sounding period is in one timeslot and signaling periods are in other timeslots, with a TDMA frame structure.

FIG. 14 illustrates a GSM/GPRS TDMA frame and its format. In the example of FIG. 14, the channel sounding procedure is performed during the first timeslot 1402. The remaining timeslots 1404, 1406, 1408, 1410, 1412, 1414, and 1416 may be assigned to mobile stations for uplink and might contain signals to be demodulated, 1418, 1420, 1422, 1424, 1426, 1428, and 1430. While the first timeslot 1402 is illustrated as being empty, terrestrial communications might still be happening in that timeslot.

The channel sounding performed in timeslot 1402 provides the receiver with a profile of the interference from adjacent carrier frequencies. This profile is used, via digital signal processing, to generate a digital out-of-phase counterpart for the interference profile. By adding this digital out-of-phase counterpart to the signals received in the remaining timeslots, 1404, 1406, 1408, 1410, 1412, and 1414, the interference from adjacent carrier frequencies is significantly reduced and the signals of interest are more accurately demodulated.

In one embodiment, a snapshot bandwidth spectrum sample of the wanted carrier of 200 kHz and the two adjacent carriers (approximately 600 kHz wide) can provide enough channel waveform data to generate a processed model that can cancel the unwanted RF in the carrier frequency of interest. Modern signal processing technology may perform near real-time or real-time sampling and processing of 600 kHz using relatively little power, so this particular embodiment is not power intensive.

In some embodiments, the sounding period(s) and signaling periods have a different relationship, such as where the sounding period that is used to take a sounding that is used to reduce the terrestrial interference during a signaling period has the same timeslot as that signaling period, but from a different frame, such as the preceding frame. In other variations, the sounding periods might vary timeslots and might not be needed for every frame.

Process for Generating Out-of-Phase Counterpart to Interference Environment

The process of generating the out-of-phase counterpart to the interference profile may be completed using a host of different algorithms to characterize a digital signal waveform. This particular embodiment uses the Fourier transform to characterize the sounded interference signal waveforms, but other algorithms may be used in place of or in addition to the Fast Fourier Transform.

Figure 15:
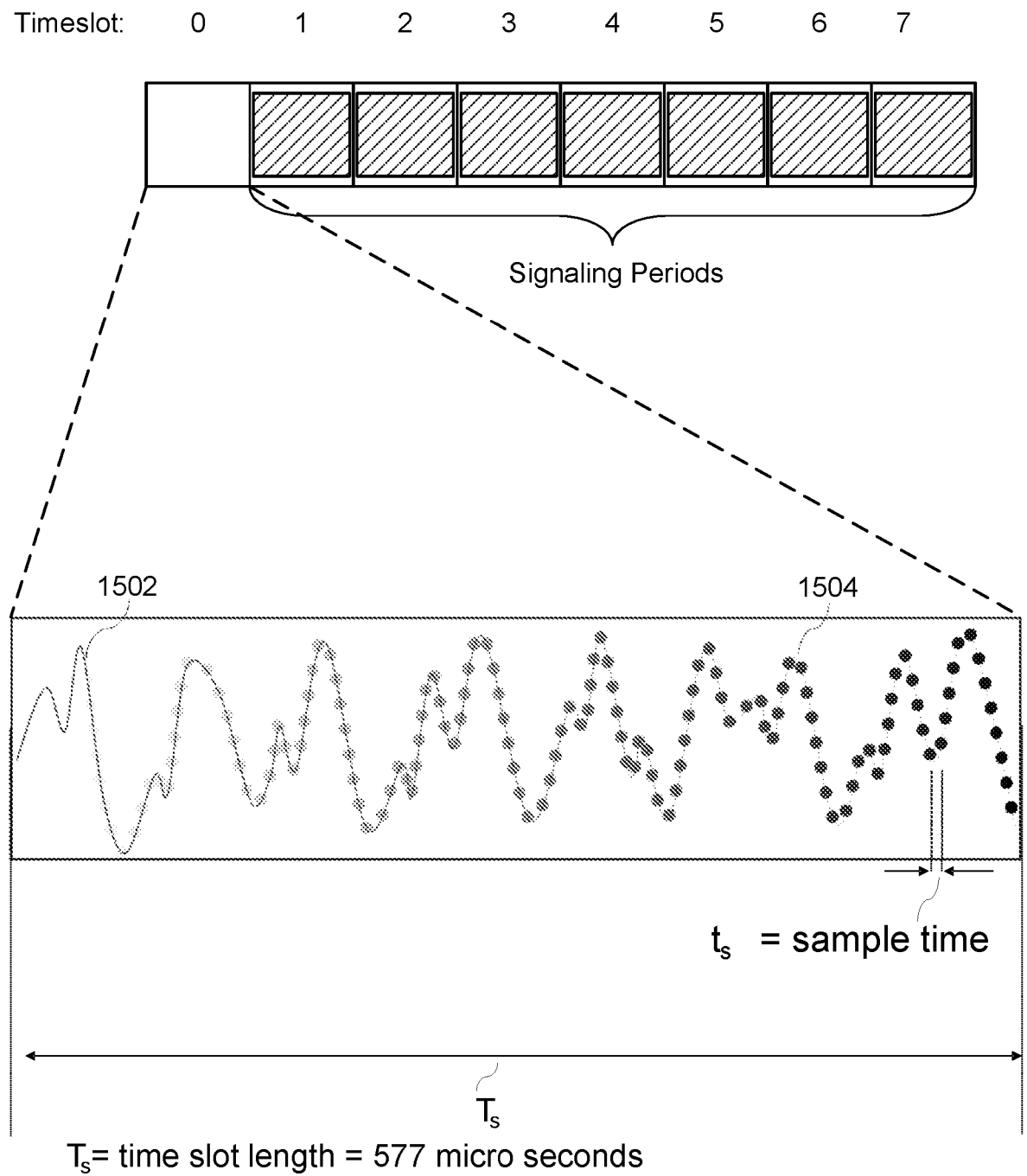
FIG. 15 illustrates how an RF signal is sampled and digitized to be represented in the digital domain as bit level values.

FIG. 15 illustrates sampling an RF signal during the channel sounding operation on the first timeslot of the GSM/GPRS TDMA frame. The analog signal, 1502, is received by the receiver (shown in FIG. 15 as a baseband signal) and sampled at a rate of $t_s^{-1}$, where $t_s$ is the time between samples (i.e., the sample time). The analog signal is sampled at this rate over a time period, denoted as $T_s$, equal to one timeslot period, or 577 microseconds. The result of this sampling is stored in the computer as a discretized vector of values of the signal level, 1504, which is of length $N=T_s/t_s$. Each of the N values in the vector comprises some number of bits that correspond to some signal energy level in dB or amplitude. This vector is the digital representation of the received signal in the time domain. The process described above can be done with a receiver front end, an analog-to-digital signal converter, and a computer with memory to store the sampled, or measured, values.

Once the signal has been converted to the digital environment, the receiver is left with a vector of values that represent a signal energy level, or amplitude, over some span of time equal to 577 microseconds in duration. This vector of signal energy values, denoted as $\vec{s}(t)$, is a discretized representation of the received signal as a function of time. The computer in the orbital base station will put this signal, $\vec{s}(t)$, through a digital signal processing block to generate the out-of-phase counterpart of the interference profile, denoted $\vec{s}'(t)$. This digital signal processing block uses the Fourier transform to fingerprint $\vec{s}(t)$ in the frequency domain, generate a corresponding out-of-phase fingerprint, and then use the inverse of the Fourier transform to generate $\vec{s}'(t)$.

The Fourier transform that is used to generate a frequency domain representation of the sampled signal can be implemented in software or hardware. The input to the Fourier transform is a digitized representation of the sounding signal in the time domain sampled at a sampling rate, such as a value for each sampling time (regularly spaced in time at the multiplicative inverse of the sampling rate) over the sampling period, where each value represents the input signal at that corresponding sampling time (such as an amplitude or energy level), perhaps as determined by an A/D. The output is a digitized representation of the signal in the frequency domain, with a complex pair for each represented frequency that might be stored as an amplitude and a phase of the signal at that represented frequency with the spacing between represented frequencies determined from the sampling rate in a conventional manner.

In the example above, when an entire timeslot is used for the sounding period, the sampling period would be $T_s=577$ μs. With the input signal (energy or amplitude) being sampled with an assumption that signal energy more than 300 kHz away on either side of the carrier frequency (600 kHz total) is not relevant, or has been filtered out, a sufficient sampling rate is 1.2 million samples/second (twice the bandwidth of 600 kHz), giving a suitable sampling time of $t_s=0.833$ μs. In that case, the total number of samples would be $T_s/t_s=692.4$ input signal time values. For simplicity, 700 input time samples might be used.

The 700 input time samples can be easily stored in memory as a time domain (TD) representation of the sounding sample. Using a Fourier transform process on those 700 input time samples, 700 complex values in the frequency domain might result, which also can be easily stored in memory for later use. Those 700 complex values represent magnitude and phase at frequencies spaced over the 600 kHz bandwidth (from −300 kHz to 300 kHz). A discrete Fourier transform operation might be performed, where the 700 input time samples are real values (or complex values with the imaginary parts assumed to all be zero) and the output is the 700 complex values. There might also be a process for interpolating to more than 700 complex values, such as 100 complex values, or reducing the number of complex values. However done, this results in a frequency domain (FD) representation of the sounding sample derived from the time domain (TD) representation of the sounding sample. That FD representation can be stored in memory. The TD representation and the FD representation can be stored in the same memory or different memories, perhaps accessible by a processor that can perform operations referenced here.

In the above example, the ratio of sampling to filter is three to one, in that the signal is sampled at 600 kHz, which is a channel and its two adjacent channels, and filtered to one channel width (200 kHz). In other variations, the ration is other than three, such as sounding over five channels, seven channels, or some even multiple of 200 kHz or even a non-multiple of 200 kHz. Also, in some embodiments, the sounding period need not be exactly one timeslot long, but might be different parts of a timeslot or less or more than 577 μs worth of samples.

Phase Base Sounding Signal Measurement

A processor might perform a phase base sounding signal measurement as follows. From the FD representation, the processor can bandpass filter the FD representation by attenuating the complex values corresponding to frequencies outside a range of −100 kHz to 100 kHz to form a filtered FD representation. This bandpass filtering might be done by simply zeroing the two-thirds of the values of the FD representation outside of the bandpass range (possibly also adjusting the phase values of the remaining samples accordingly).

Using an inverse Fourier Transform with the filtered FD representation representing the 200 kHz of bandwidth of interest, the processor can generate a reconstructed TD representation that might by 700 real-valued energy or amplitude values, back in the time domain. The reconstructed TD representation can be stored as a sounding base signal for the signal bandwidth of interest.

The sounding base signal can be subtracted from a time domain representation of a signal captured from a signal period using vector addition. In this manner, the sounding base signal can be filtered out of the captured signal and used for cancelling interference that is known to be coherent, or of relatively unchanging phase over small periods of time.

Amplitude Base Sounding Signal Measurement

Alternatively, another type of sounding base signal could be assumed to be the amplitude portion of the filtered FD representation complex values representing the 200 kHz of bandwidth of interest. These amplitude portions might be stored as real values in memory, and then subtracted from the amplitude portions of a frequency-domain filtered representation of a signal captured during a signal period. The Amplitude base sounding signal might be useful in cancelling interference that is known to have relatively constant signal amplitude over small periods of time.

Phase and Amplitude Base Sounding Signal Measurement

There could also be some combination of a phase based and amplitude based sounding signal that is used to generate a cancellation effect for the interference environment in the 200 kHz bandwidth of interest. A method like this using both amplitude and phase of the sounding signal might be useful in cancelling interference that is known to be of relatively constant phase and amplitude over short periods of time.

Example Process Flow

Figure 16:
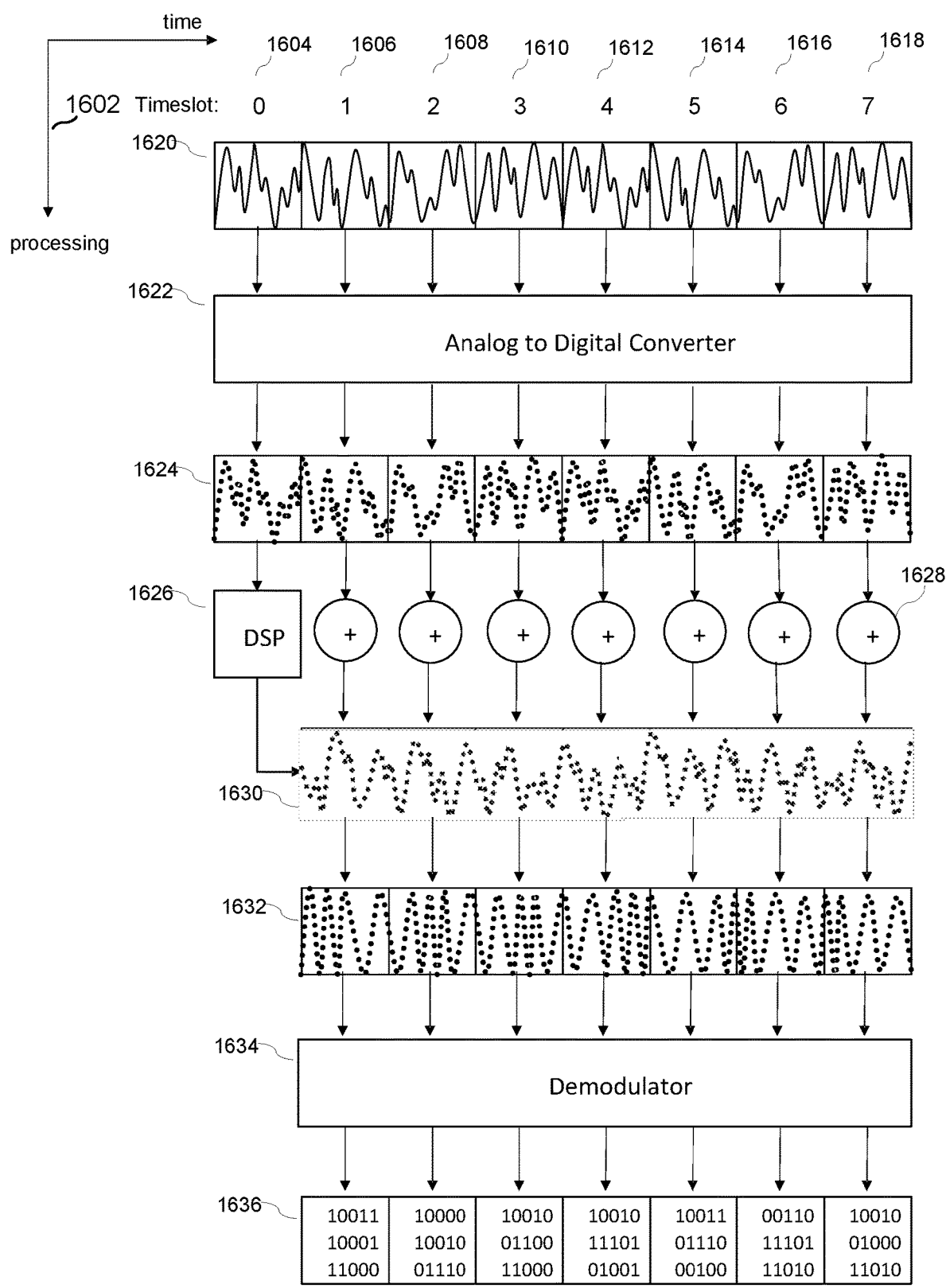
FIG. 16 illustrates the results of processing steps that might occur in the digital signal processing illustrated in FIG. 13.

FIG. 16 provides a flow summary of the process of processing steps that might occur in the digital signal processing illustrated in FIG. 13, using a phase base sounding signal for canceling the interference in other timeslots. The process flow, 1602, indicates that the horizontal axis represents time, specifically, timeslot number, denoted by 1604, 1606, 1608, 1610, 1612, 1614, 1616, and 1618. The vertical axis represents process steps conducted within each of those timeslots. 1620 represents the analog signal that the receiver receives. That analog signal is processed through an analog to digital converter, 1622. The result of that process is 1624 and in the case of the first timeslot, the signal is processed through a digital signal processing (DSP) block. This DSP block calculates the out-of-phase counterpart, 1630, as it is described in the language above. The signals from timeslots 1606-1718 are added digitally, 1628, to the out-of-phase counterpart, 1630. The result of this operation is a clearer signal of interest, represented by 1632. A signal demodulator 1634 is used to demodulate the processed signal 1632 to generate a demodulated signal comprising perhaps a data packet of 1s and 0s, 1636.

Figure 17:
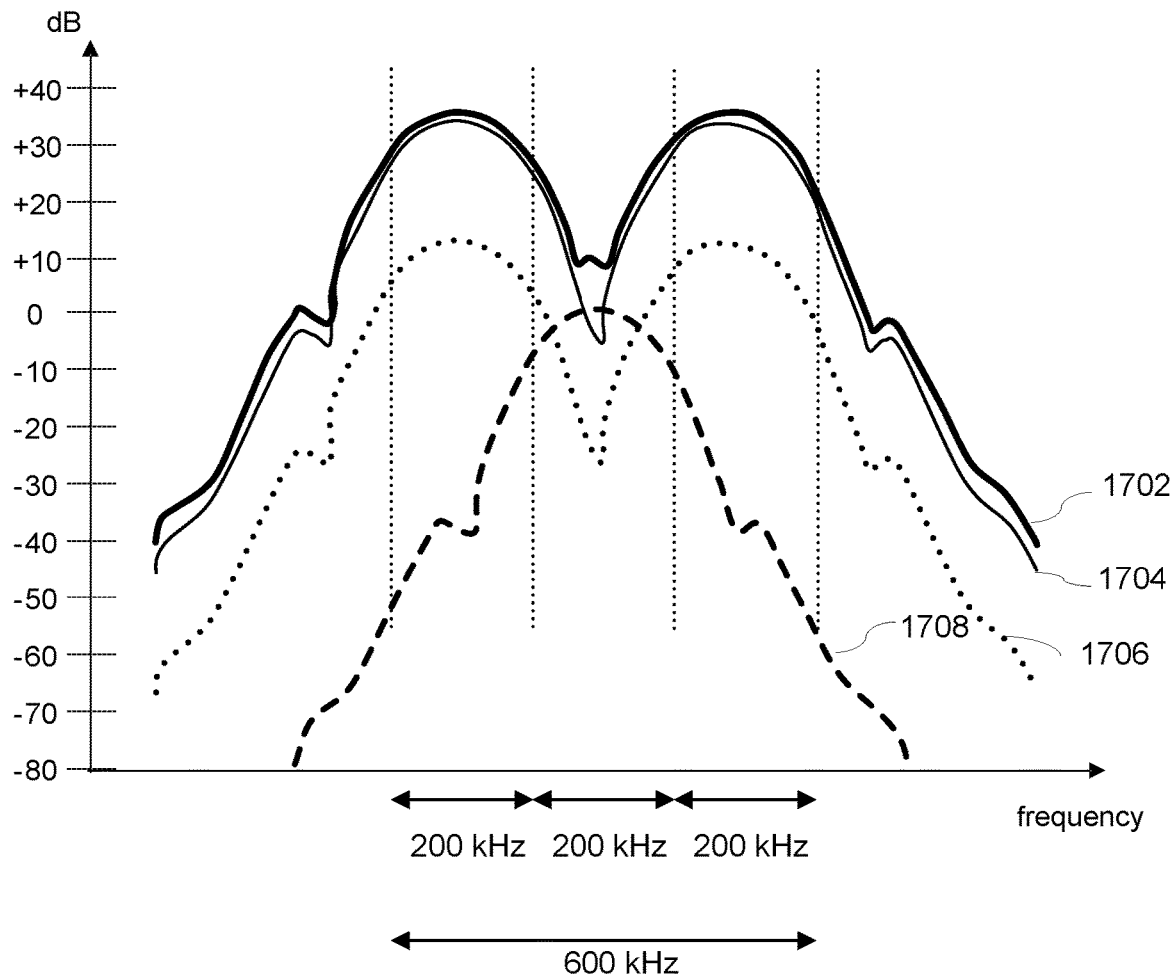
FIG. 17 illustrates, in the frequency domain, how the digital profile nulls out interference from coherent signal energy that originates in the wanted channel or adjacent channel.

FIG. 17 illustrates how the embodiment mitigates adjacent carrier interference in the frequency domain. When signals of interest arrive, the receiver takes in an analog signal which includes interference and the signal of interest, 1702. The energy from the interference signals, 1704, is digitally removed using the out-of-phase interference counterpart from the interference sounding process. The result of this process might yield something like 1706 where the original signal of interest, 1708, has a much higher SINR.

What is claimed is:

1. A multiple access transceiver adapted for operation in Earth orbit and configured for communication with terrestrial mobile devices, the terrestrial mobile devices also capable of communicating with terrestrial base stations, the multiple access transceiver comprising:
   a transceiver capable of receiving an incoming signal in orbit from some of the terrestrial mobile devices comprising a first plurality of the terrestrial mobile devices that are communicating with terrestrial base stations and a particular mobile device that is distinct from the first plurality of the terrestrial mobile devices;
   a filtering module that reduces a first portion of the incoming signal due to the first plurality of the terrestrial mobile devices communicating with terrestrial base stations to produce a filtered signal comprising a first signal contributed from the particular mobile device communicating with the multiple access transceiver in orbit; and
   a signal demodulator that demodulates the filtered signal to produce a demodulated signal corresponding to the first signal from the particular mobile device.

2. The multiple access transceiver of claim 1 wherein the filtering module samples a frame in which the particular mobile device is known to not be transmitting.

3. The multiple access transceiver of claim 1, wherein the particular mobile device does not transmit during a first time period during which the transceiver sounds a channel to produce a sample from the incoming signal.

4. The multiple access transceiver of claim 3, wherein the filtering module converts the sample to a discretized vector in a time domain.

5. The multiple access transceiver of claim 3, wherein the filtering module processes the sample using a Fourier transform to produce an out-of-phase counterpart of the sample.

6. The multiple access transceiver of claim 3, wherein the filtering module processes the sample to produce an out-of-phase counterpart of the sample.

7. The multiple access transceiver of claim 6, wherein the transceiver receives a second portion of the incoming signal during a second time period which does not overlap the first time period.

8. The multiple access transceiver of claim 7, wherein the filtering module applies the out-of-phase counterpart to the second portion of the incoming signal to produce the filtered signal.

9. The multiple access transceiver of claim 8, wherein the out-of-phase counterpart is applied to the second portion of the incoming signal by summing the out-of-phase counterpart with the second portion.

10. The multiple access transceiver of claim 3, wherein the filtering module processes the sample to measure amplitude to generate a base signal for interference reduction.

11. The multiple access transceiver of claim 3, wherein the filtering module processes the sample to measure amplitude and phase to generate a base signal for interference reduction.

12. The multiple access transceiver of claim 1, wherein the demodulated signal is further processed to produce a binary code.

* * * * *